(12) United States Patent
Rohde et al.

(10) Patent No.: US 10,949,865 B2
(45) Date of Patent: *Mar. 16, 2021

(54) STREAMLINED DATA ENTRY PATHS USING INDIVIDUAL ACCOUNT CONTEXT ON A MOBILE DEVICE

(71) Applicant: salesforce.com, inc., San Francisco, CA (US)

(72) Inventors: Sönke Rohde, San Francisco, CA (US); Craig Villamor, San Mateo, CA (US); Akhilesh Gupta, San Francisco, CA (US); Grant Anderson, San Francisco, CA (US); Jason Schroeder, Los Angeles, CA (US); Charlie Issacs, San Jose, CA (US); John Walter Taschek, San Francisco, CA (US); Steve Gillmor, Daly City, CA (US); Girish Jashnani, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/112,164

(22) Filed: Aug. 24, 2018

(65) Prior Publication Data
US 2018/0365713 A1   Dec. 20, 2018

Related U.S. Application Data

(63) Continuation of application No. 14/016,033, filed on Aug. 30, 2013, now Pat. No. 10,089,638.
(Continued)

(51) Int. Cl.
*G06Q 30/02* (2012.01)

(52) U.S. Cl.
CPC ......... *G06Q 30/0201* (2013.01); *G06Q 30/02* (2013.01)

(58) Field of Classification Search
CPC ..................................................... G06Q 30/02
See application file for complete search history.

(56) References Cited

U.S. PATENT DOCUMENTS 5,577,188 A   11/1996   Zhu
5,608,872 A   3/1997    Schwartz et al.
(Continued)

OTHER PUBLICATIONS

United States Patent and Trademark Office, "Non-Final Office Action", issued in connection with U.S. Appl. No. 14/016,033, dated Jun. 1, 2016 (14 pages).
(Continued)

*Primary Examiner* — Kurtis Gills
(74) *Attorney, Agent, or Firm* — Holland & Hart LLP

(57) ABSTRACT

The technology disclosed relates to rapidly logging sales activities in a customer relationship management system. It also relates to simplifying logging of sale activities by offering a streamlined data entry path that as immense usability in a mobile environment. The streamlined data entry path can be completed by triple-action, double-action, or single-action. In particular, the technology disclosed relates to automatically identifying and selecting entities that are most likely to be selected by a user. The identification of entities as most likely to be selected is dependent at least upon access recency of records of the entities, imminence of events linked to the entities, and geographic proximities of the entities to the user. It further relates to automatically identifying and selecting sales activities that are most likely to be performed by the user. The identification of sales activities as most likely to be performed is dependent at least upon position of the sale activities in a sales workflow and time elapsed since launch of the sales workflow.

15 Claims, 14 Drawing Sheets

Related U.S. Application Data

(60) Provisional application No. 61/815,460, filed on Apr. 24, 2013, provisional application No. 61/712,394, filed on Oct. 11, 2012, provisional application No. 61/702,002, filed on Sep. 17, 2012, provisional application No. 61/702,046, filed on Sep. 17, 2012.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniarn et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,532,283 B1 | 9/2013 | Haggerty et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0128865 A1 | 7/2003 | White |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0007189 A1 | 1/2006 | Gaines, III et al. |
| 2006/0021019 A1 | 1/2006 | Hinton et al. |

(56) References Cited

U.S. PATENT DOCUMENTS

| | | |
|---|---|---|
| 2007/0112649 A1 | 5/2007 | Schlabach |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0179829 A1 | 7/2010 | Gedeon et al. |
| 2010/0306228 A1* | 12/2010 | Carpenter ............. G06Q 30/02 707/765 |
| 2011/0029862 A1* | 2/2011 | Scott .................... G06F 3/0237 715/261 |
| 2011/0197128 A1* | 8/2011 | Assadollahi ......... G06F 3/0237 715/259 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0221353 A1 | 8/2012 | Dvorak et al. |
| 2012/0233137 A1 | 9/2012 | Jakobson et al. |
| 2012/0289787 A1 | 11/2012 | Kurgan et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |

OTHER PUBLICATIONS

United States Patent and Trademark Office, "Final Office Action", issued in connection with U.S. Appl. No. 14/016,033, dated Dec. 15, 2016 (15 pages).

United States Patent and Trademark Office, "Non-Final Office Action", issued in connection with U.S. Appl. No. 14/016,033, dated Oct. 19, 2017 (8 pages).

United States Patent and Trademark Office, "Notice of Allowance", issued in connection with U.S. Appl. No. 14/016,033, dated May 31, 2018 (7 pages).

\* cited by examiner

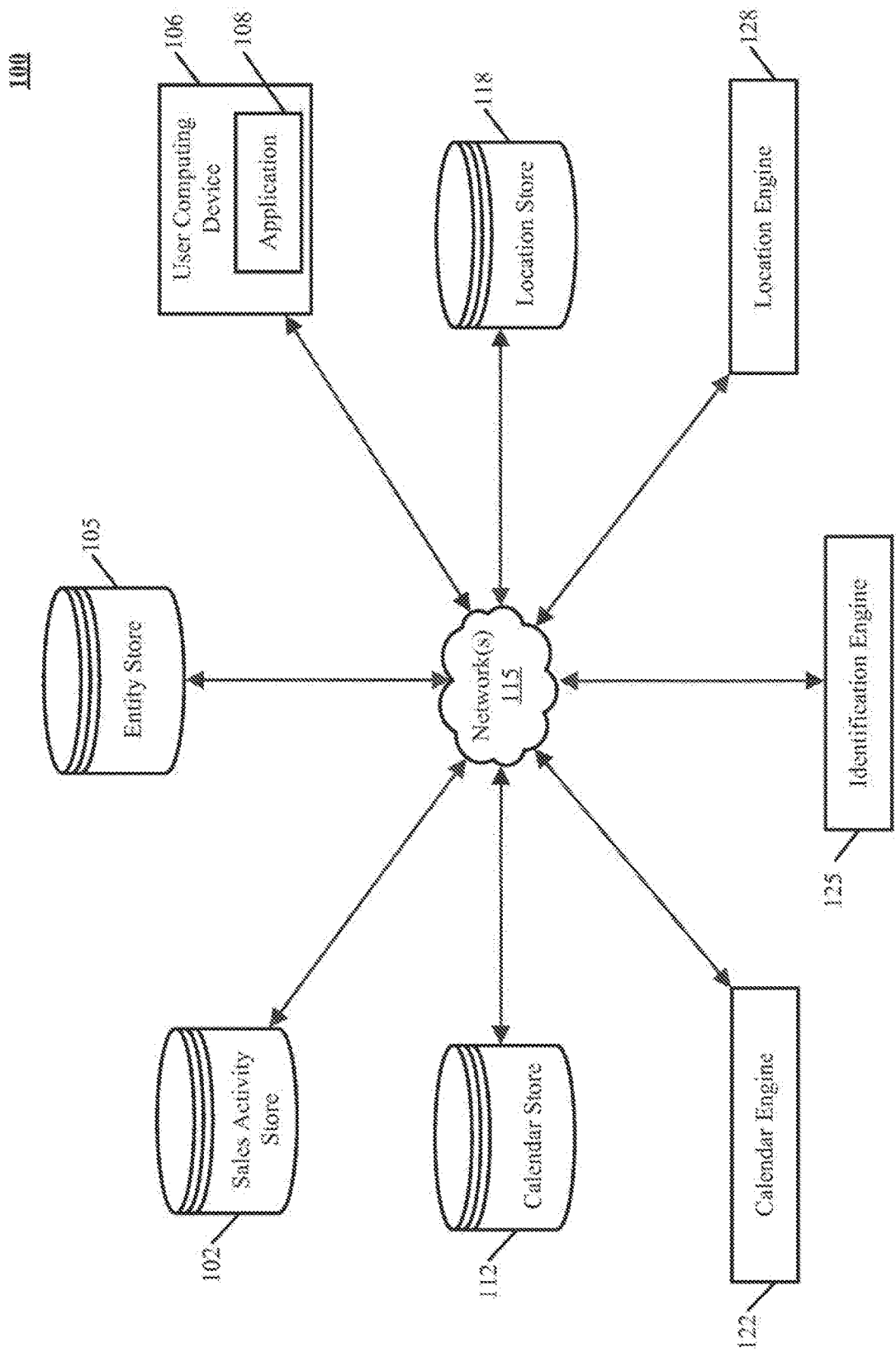
FIG. 1 – Logging Environment

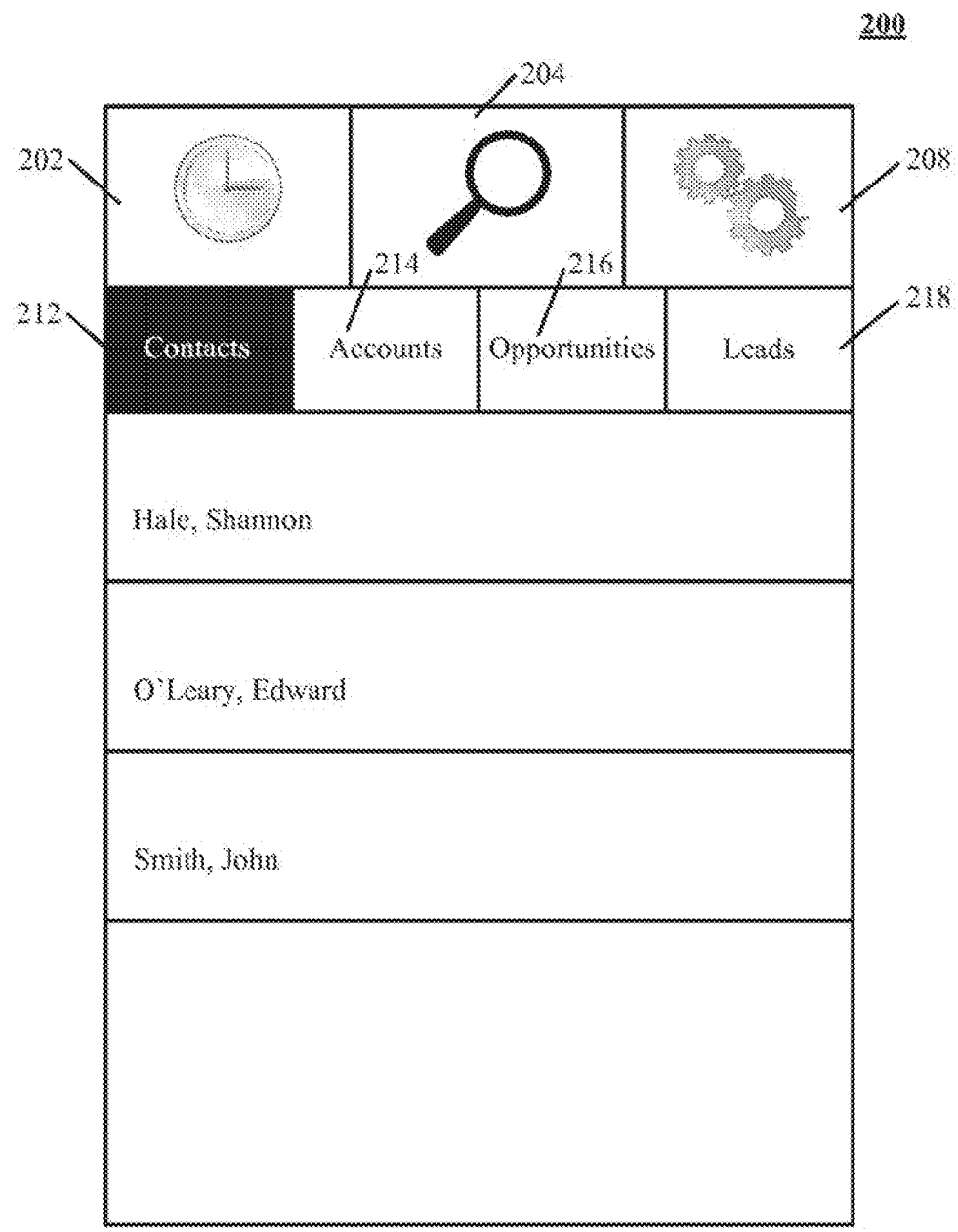
FIG. 2 – Most Recently Accessed Records

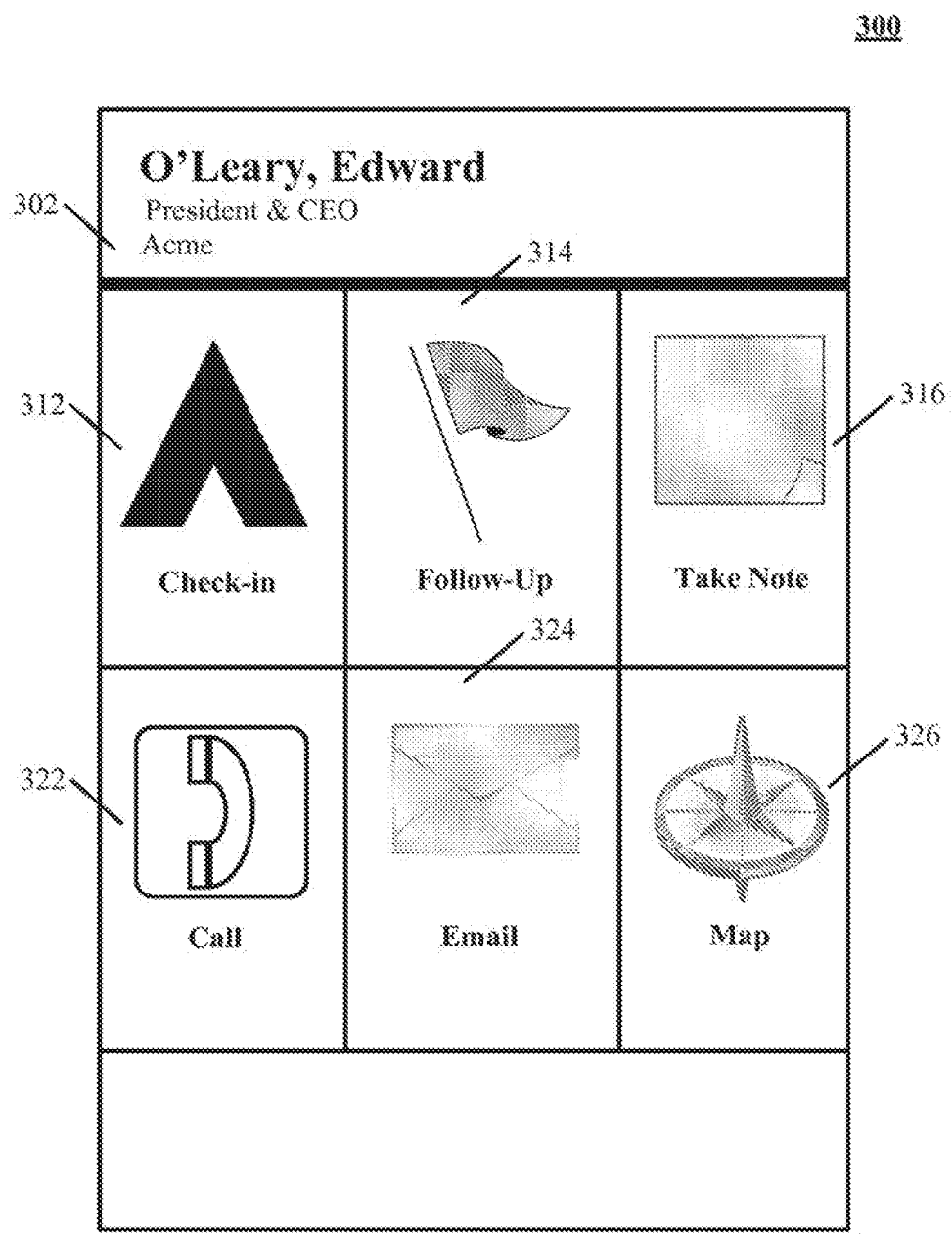
FIG. 3 – Sales Activities

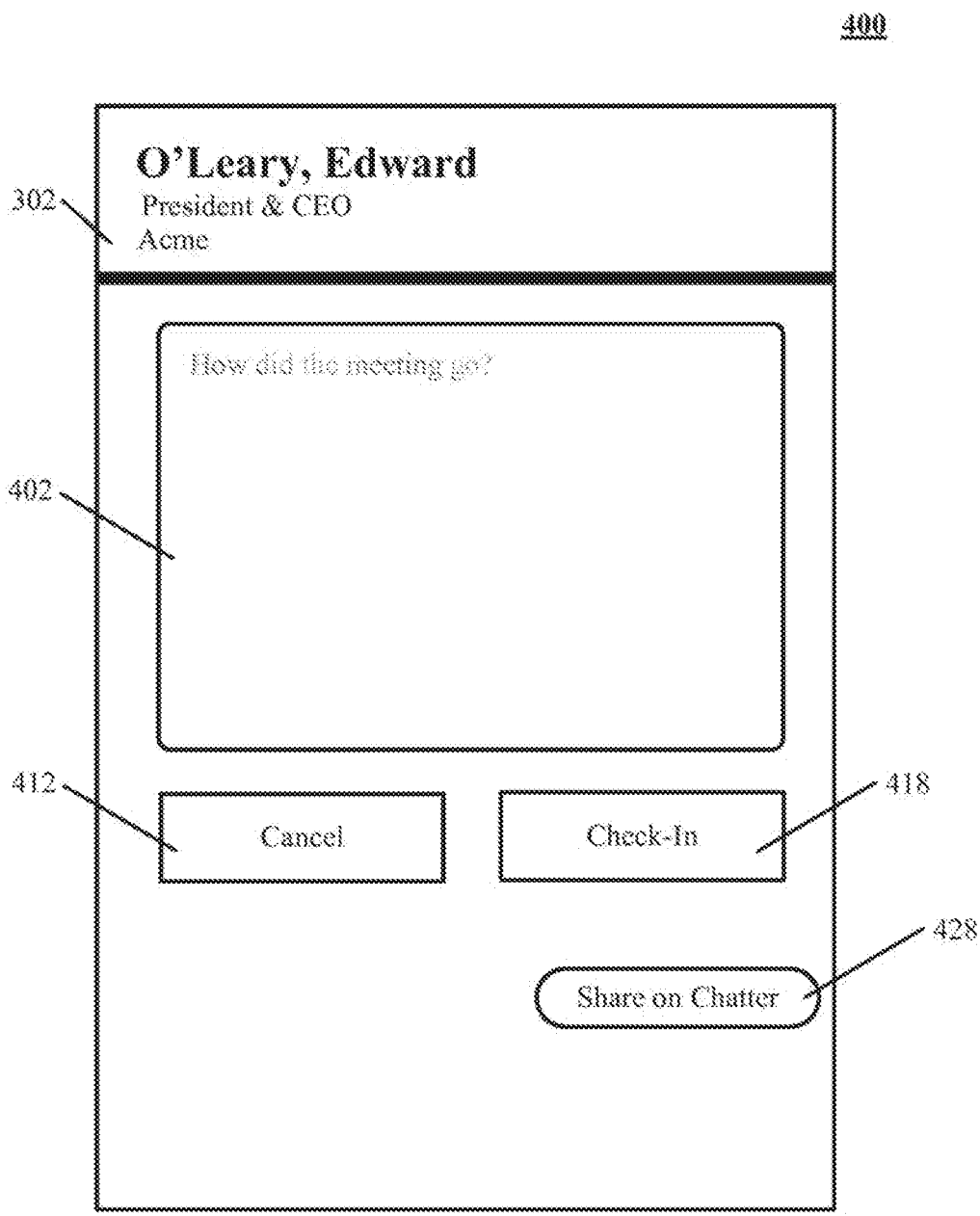
FIG. 4 – Check-In

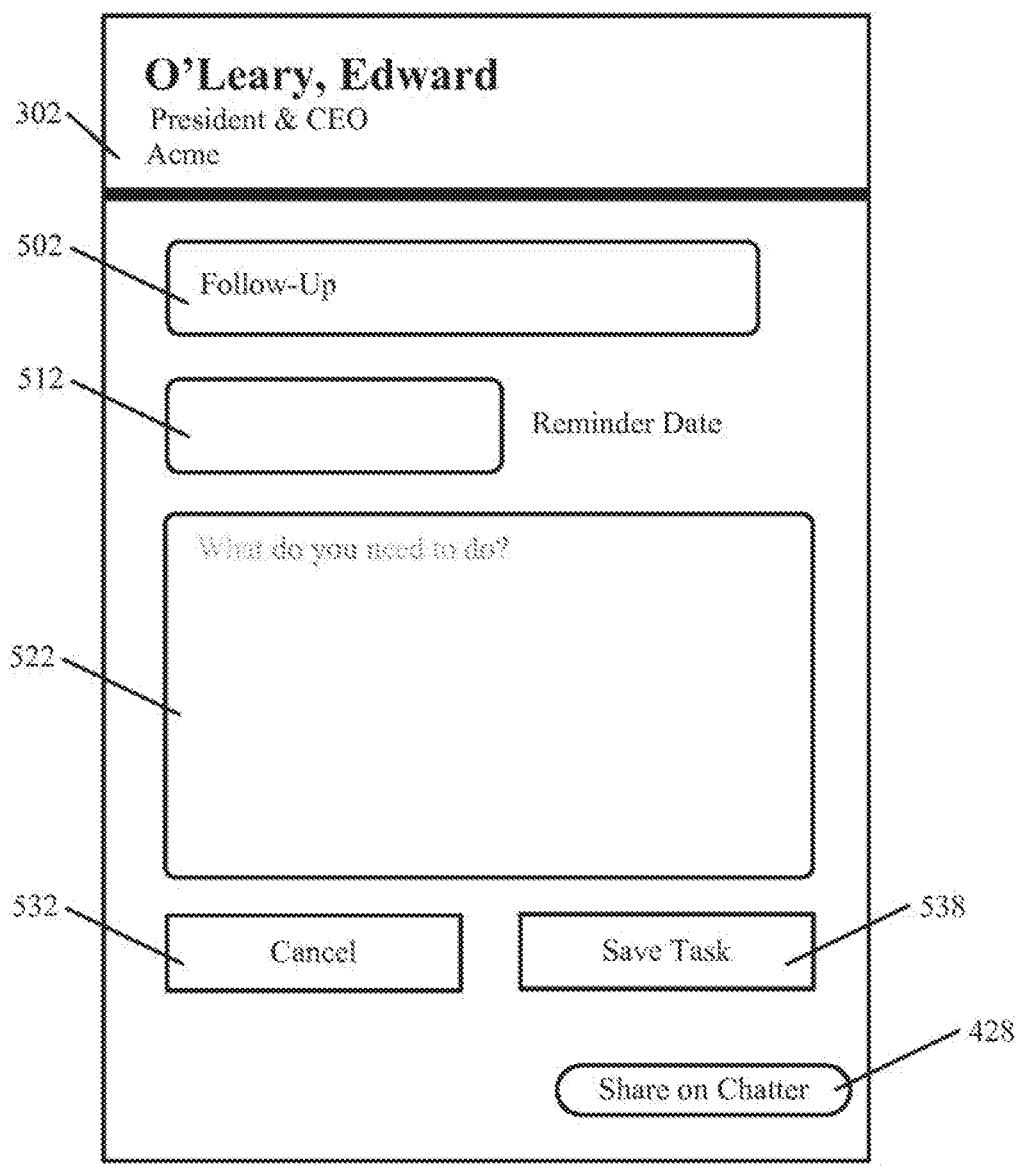
FIG. 5 – Follow-Up

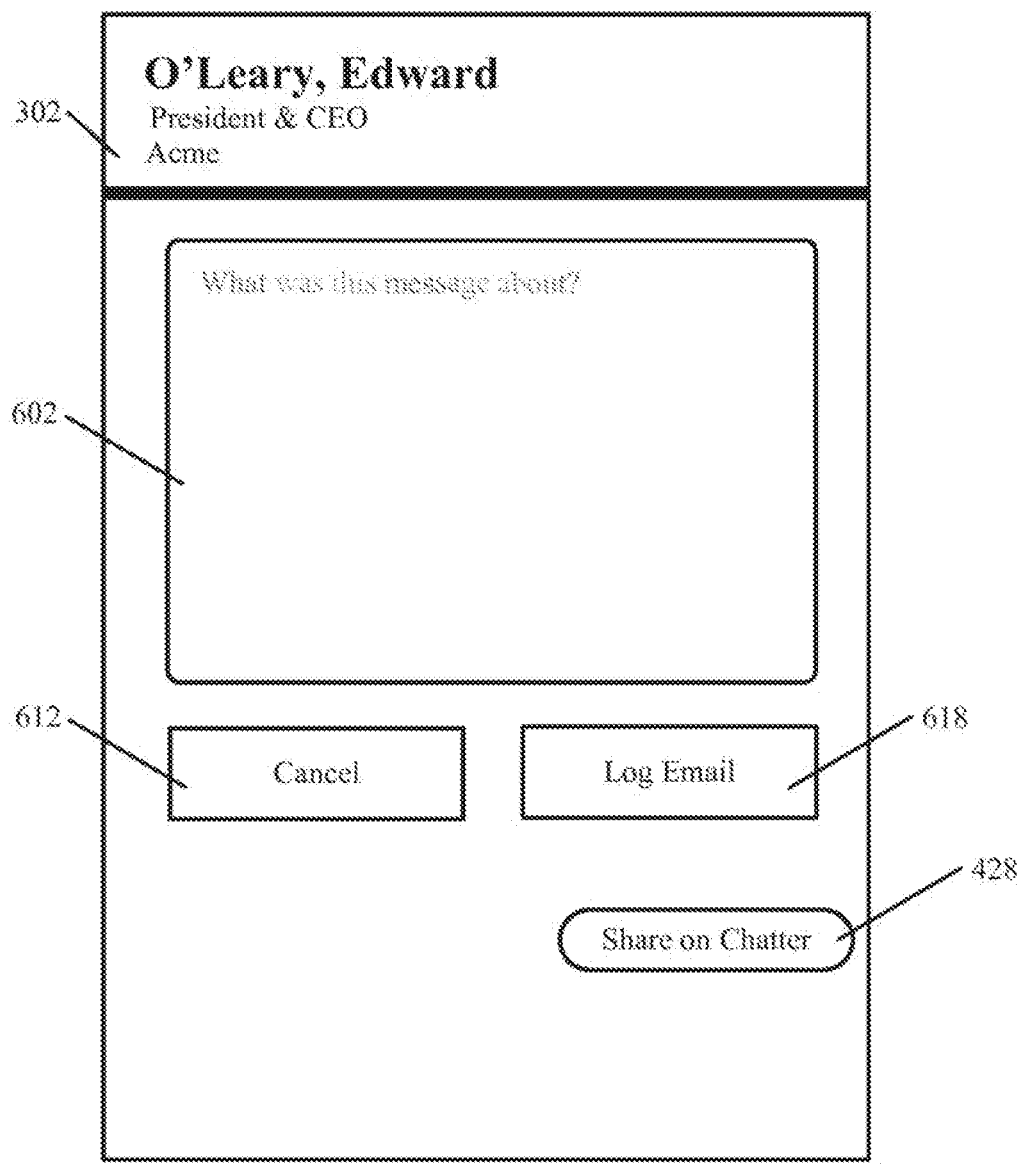
FIG. 6 – Email Logging

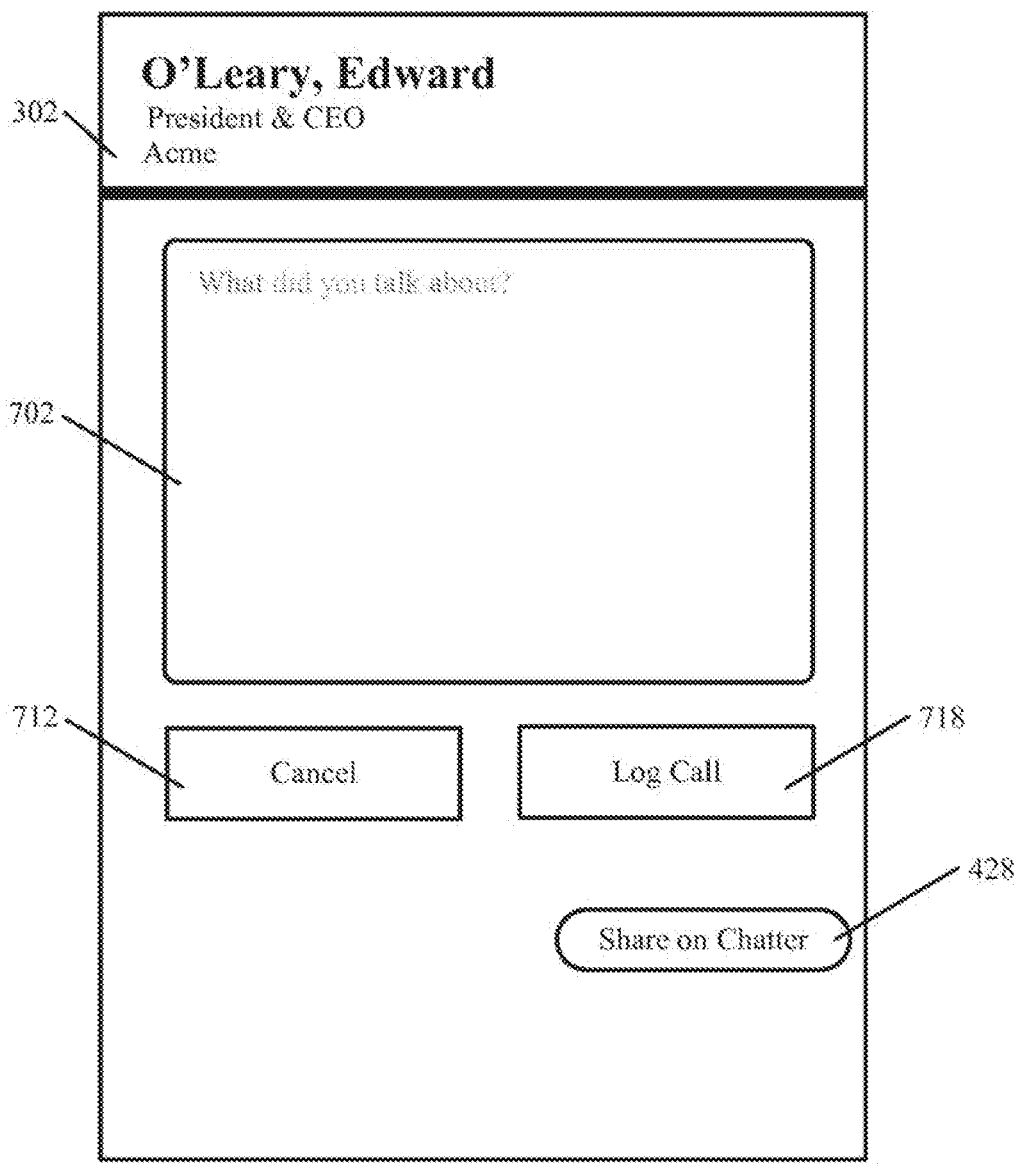
FIG. 7 – Call Logging

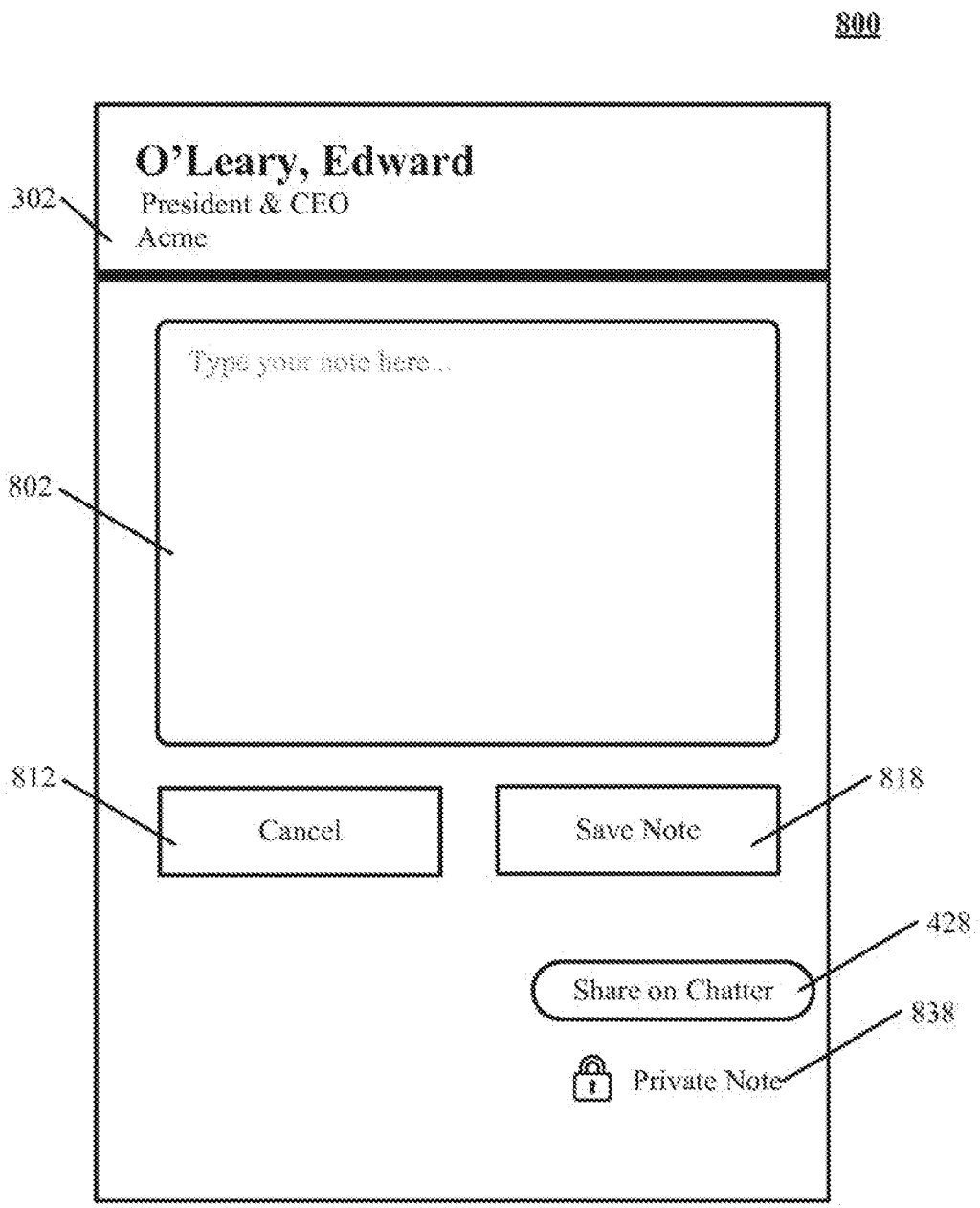
FIG. 8 – Note Logging

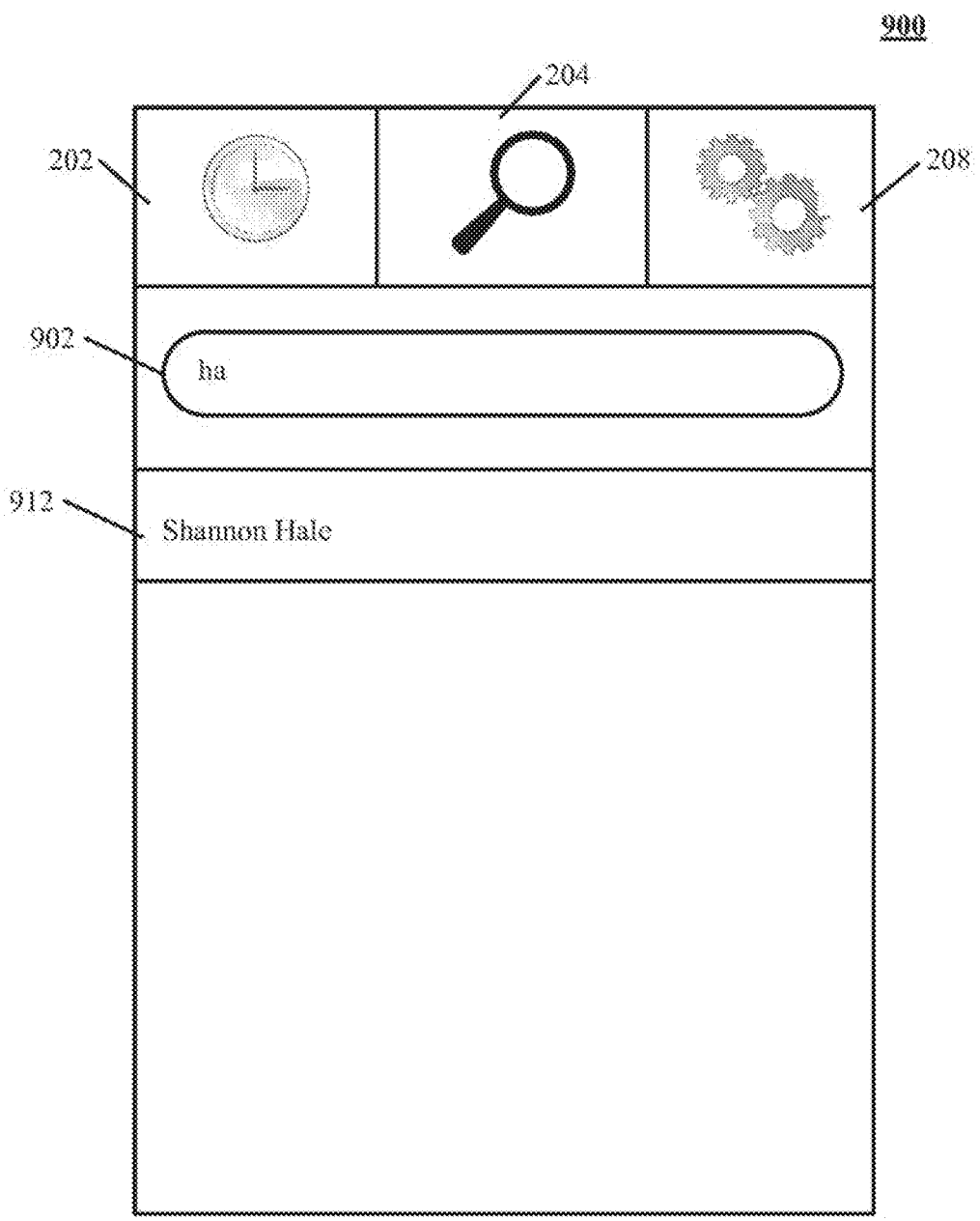
FIG. 9 – Entity Search

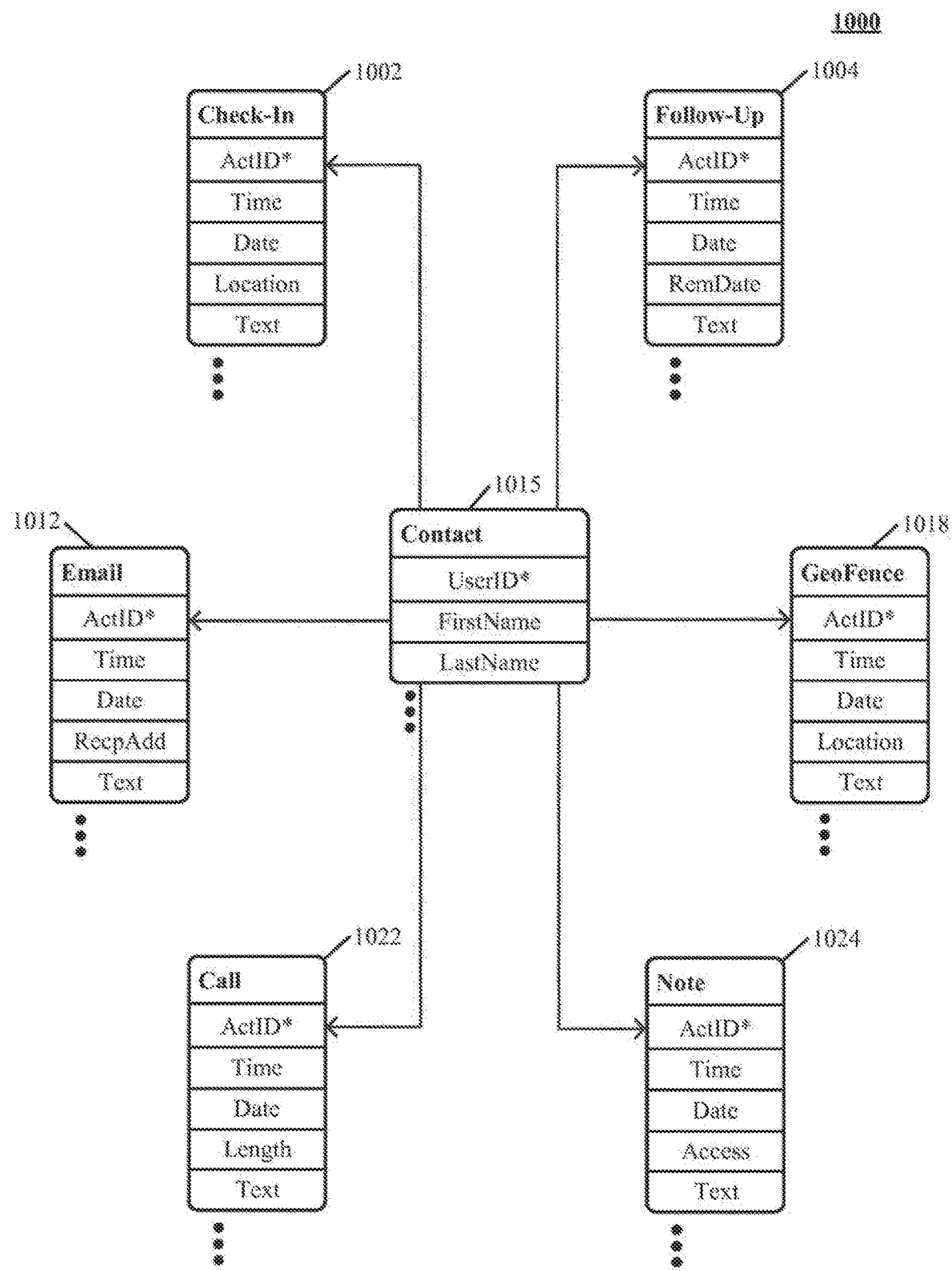
FIG. 10 – Logged Records

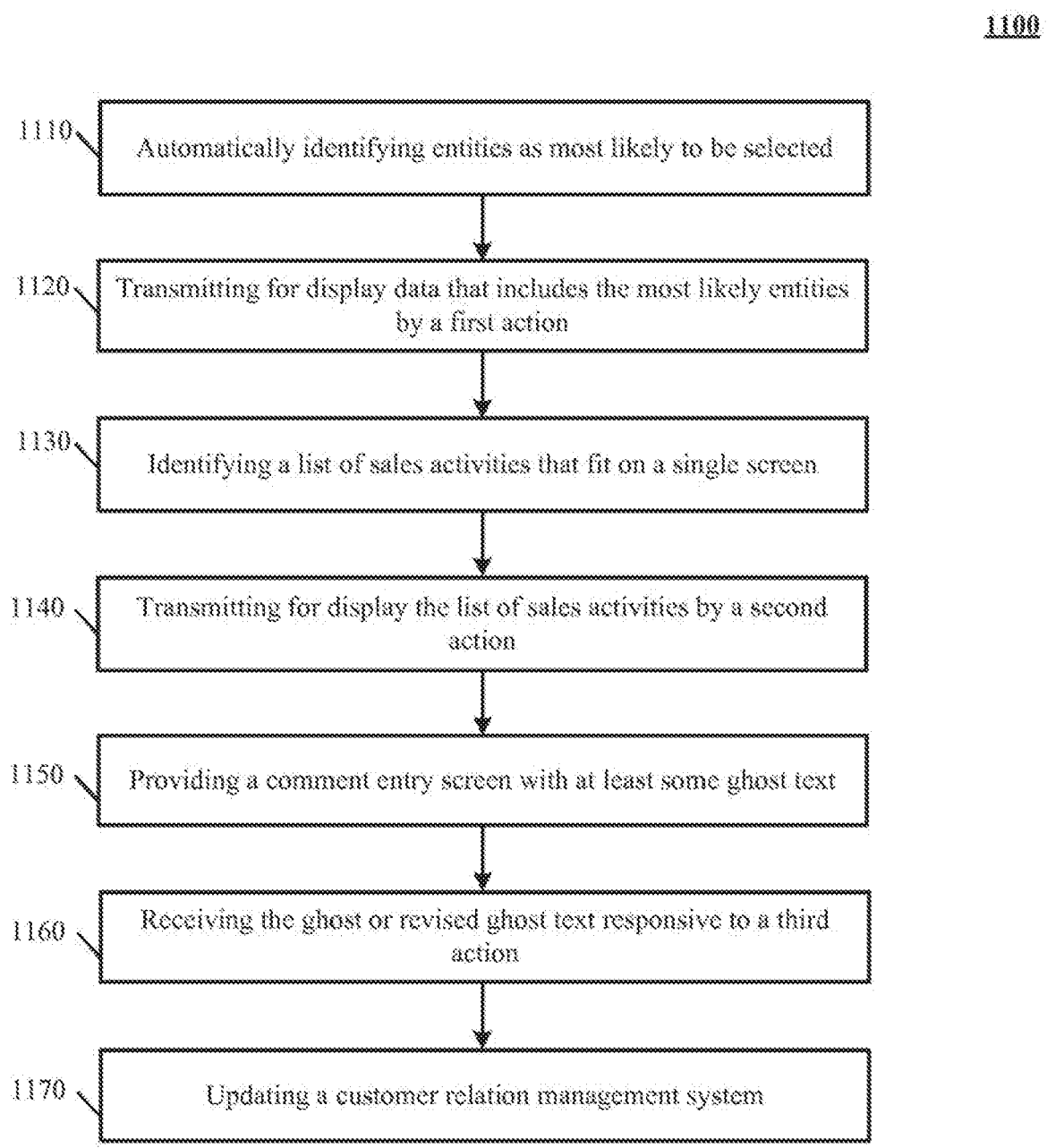
FIG. 11 – Flowchart of Triple-Action Logging

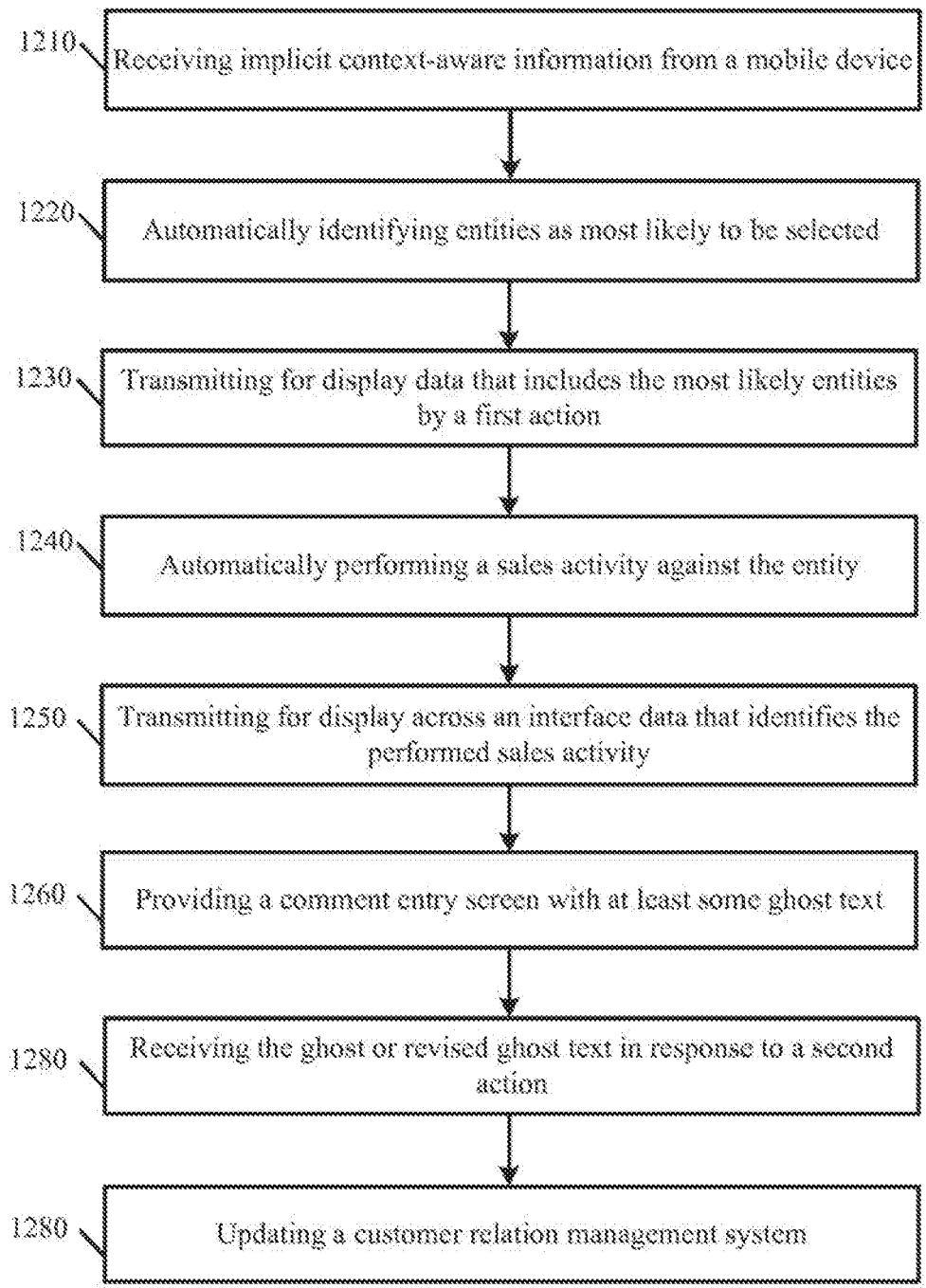
FIG. 12 – Flowchart of Double-Action Logging

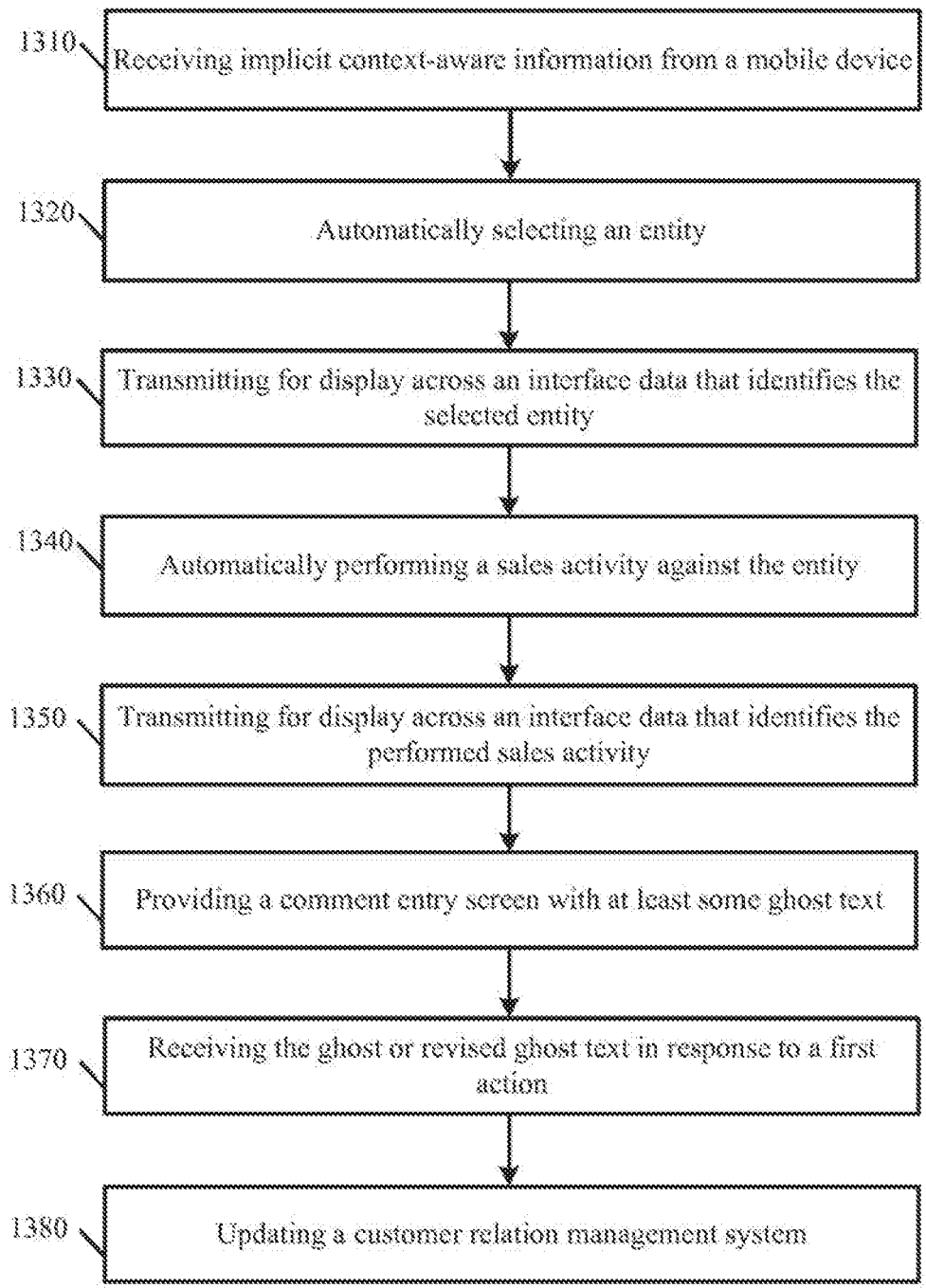
FIG. 13 – Flowchart of Single-Action Logging

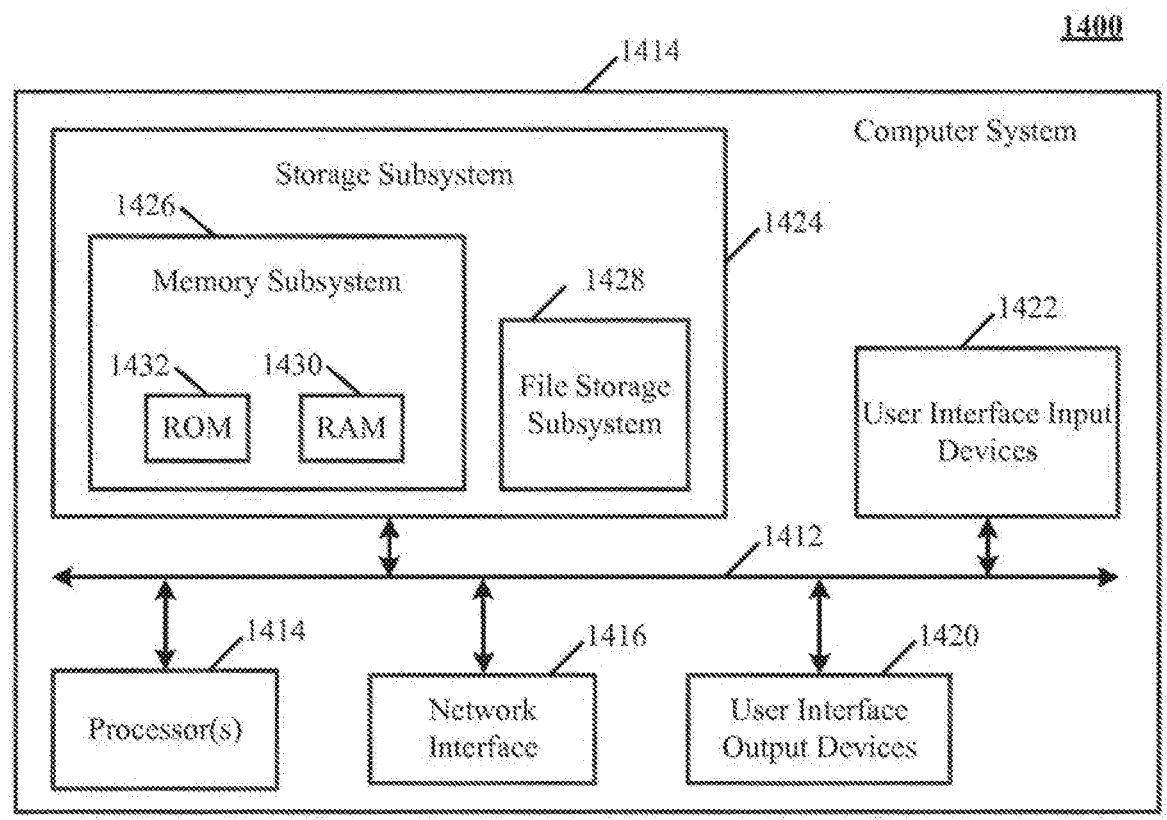
FIG. 14 – Computer System

STREAMLINED DATA ENTRY PATHS USING INDIVIDUAL ACCOUNT CONTEXT ON A MOBILE DEVICE

CROSS REFERENCES

This application is a continuation of U.S. patent application Ser. No. 14/016,033, by Rohde, et al., entitled "Streamlined Data Entry Paths Using Individual Account Context On A Mobile Device," filed Aug. 30, 2013, which claims the benefit of four US provisional patent applications, including: No. 61/702,002, entitled, "System and Method for Determining the Next Best Task for a User," filed 17 Sep. 2012; No. 611702,046, entitled, "System and Method for Sales Logging," filed 17 Sep. 2012; No. 61/712,394, entitled, "System and Method for Managing User Operability in a Mobile Environment," filed 11 Oct. 2012; and No. 61/815,460, entitled, "System and Method for Creating a Context Bus Between Devices," filed 24 Apr. 2013. The provisional applications are hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior alt. The subject matter in the background section merely represents different approaches, which in and of themselves may also correspond to implementation s of the claimed technology.

DESCRIPTION OF RELATED ART

The technology disclosed relates to rapidly logging sales activities in a customer relationship management system. It also relates to simplifying logging of sale activities by offering a streamlined data entry path that as immense usability in a mobile environment. The streamlined data entry path can be completed by triple-action, double-action, or single-action. In particular, the technology disclosed relates to automatically identifying and selecting entities that are most likely to be selected by a user. The identification of entities as most likely to be selected is dependent at least upon access recency of records of the entities, imminence of events linked to the entities, and geographic proximities of the entities to the user. It further relates to automatically identifying and selecting sales activities that are most likely to be performed by the user. The identification of sales activities as most likely to be performed is dependent at least upon position of the sale activities in a sales workflow and time elapsed since launch of the sales workflow.

As the volume of information logged with data entries continues to increase, the demand for simplified data logging techniques is also increasing. Current enterprise management systems are typically not offered in user friendly mobile environments. This makes the life of the sales representative harder and forces them to lag in their data entries. With the advent of the mobile computing culture, it becomes practical to offer systems and methods that enable sales representatives to update enterprise management systems on the go.

An opportunity arises to override over-time logging and use more efficient reporting techniques that save time and effort. Improved user experience and engagement and higher customer satisfaction and retention may result.

SUMMARY

The technology disclosed relates to rapidly logging sales activities in a customer relationship management system. It also relates to simplifying logging of sale activities by offering a streamlined data entry path that as immense usability in a mobile environment. The streamlined data entry path can be completed by triple-action, double-action, or single-action. In particular, the technology disclosed relates to automatically identifying and selecting entities that are most likely to be selected by a user. The identification of entities as most likely to be selected is dependent at least upon access recency of records of the entities, imminence of events linked to the entities, and geographic proximities of the entities to the user. It further relates to automatically identifying and selecting sales activities that are most likely to be performed by the user. The identification of sales activities as most likely to be performed is dependent at least upon position of the sale activities in a sales workflow and time elapsed since launch of the sales workflow.

Other aspects and advantages of the present technology can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows an example environment of rapidly logging sales activities.

FIG. 2 illustrates one implementation of an interface displaying records of entities that have been most recently accessed.

FIG. 3 is one implementation of an interface displaying various sales activities that can be performed against entities.

FIG. 4 shows one implementation of an interface displaying logging of check-in events linked to entities.

FIG. 5 is one implementation of an interface displaying logging of follow-up tasks linked to entities.

FIG. 6 illustrates one implementation of an interface displaying logging of email communications with entities.

FIG. 7 shows one implementation of an interface displaying logging of voice communications with entities.

FIG. 8 is one implementation of an interface displaying logging of memorandums linked to entities.

FIG. 9 shows one implementation of an interface displaying entity search among most recently accessed records of entities.

FIG. 10 illustrates one implementation of a plurality of objects that can be used to rapidly log sales activities performed against entities.

FIG. 11 is a flowchart of one implementation of logging of sales activities by a triple-action data entry path.

FIG. 12 shows a flowchart of one implementation of logging of sales activities by a double-action data entry path.

FIG. 13 illustrates a flowchart of one implementation of logging of sales activities by a single-action data entry path.

FIG. 14 is a block diagram of an example computer system for rapidly logging sales activities.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods according to the disclosed implementations are described in a "sales" context. The examples of sales activities such as check-ins or follow-ups and sales entities like accounts, opportunities, or leads are being provided solely to add context and aid in the understanding of the disclosed implementations. In other instances, other examples of activities and entities may respectively include product developments, marketing campaigns, or service calls and engineers, executives, or technicians. Other applications are possible, such that the following examples should not be taken as definitive or limiting either in scope, context or setting. It will thus be apparent to one skilled in the art that implementations may be practiced in or outside the "sales" context.

The technology disclosed relates to rapid logging of sales activities by using
computer-implemented systems. The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology may be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

As used herein, a given signal, event or value is "dependent upon" a predecessor signal, event or value if the predecessor signal, event or value influenced the given signal, event or value. If there is an intervening processing element, step or time period, the given signal, event or value can still be "dependent upon" the predecessor signal, event or value. If the intervening processing element or step combines more than one signal, event or value, the signal output of the processing element or step is considered "dependent upon" to each of the signal, event or value inputs. If the given signal, event or value is the same as the predecessor signal, event or value, this is merely a degenerate case in which the given signal, event or value is still considered to be "dependent upon" the predecessor signal, event or value. "Responsiveness" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

The technology disclosed can be applied to solve the technical problem of lengthy and cumbersome data entry. In the example given, the problem of logging of sales activities. Sales representatives spend a significant portion of their working hours logging their sales activities in customer relationship management (CRM) systems. This is not only inefficient but is prone to errors considering the information that is logged. Furthermore, mobile CRM solutions, while including all the features of desktop CRM systems, fail to provide a user friendly and smooth mobile experience, making it harder for the sales representatives to log data on the go. This gives rise to the concern that key analytics, which drive decision making at business organizations, can be derived from inaccurate and deficient data.

The technology disclosed relates to providing a streamlined data entry path that significantly simplifies logging of sales activities. In particular, it relates to enhancing the mobile CRM experience for the sales representatives by rationalizing data entry steps to not more than three actions, while adequately and adequately capturing the sales activities. In other implementations, the technology disclosed shortens the data entry steps to two actions and further just to one action.

In the triple-action data entry path, the technology disclosed automatically identifies entities as most likely to be selected for sales activity logging based at least on access recency of records of the entities, imminence of events linked to the entities, and geographic proximities of the entities to the user. A first action accepts selection among the most likely entities. Then, a list of sales activities that can be performed on a selected entity is identified and a selection of a sales activity is received in response to a second action. Finally, in response to a third action, a CRM system is updated to include the selections and entries made during the triple-action data entry path.

In the double-action data entry path, the technology disclosed automatically identifies entities as most likely to be selected for sales activity logging based at least on access recency of records of the entities, imminence of events linked to the entities, and geographic proximities of the entities to the user. A first action accepts selection among the most likely entities. Then, a sales activity, that is identified as most likely to be executed, is automatically performed. The identification of the sales activity as most likely to be executed is based at least on position of the sale activity in a sales workflow and time elapsed since launch of the sales workflow. Finally, in response to a second action, a CRM system is updated to include the selections and entries made during the double-action data entry path.

In the single-action data entry path, the technology disclosed automatically selects an entity that is identified as most likely to be contacted, used, or acted upon. The identification of the entity is based at least on access recency of records of the entity, imminence of events linked to the entity, and geographic proximities of the entity to the user. Then, a sales activity, which is identified as most likely to be executed, is automatically performed. The identification of the sales activity as most likely to be executed is based at least on position of the sale activity in a sales workflow and time elapsed since launch of the sales workflow. Finally, in response to a first action, a CRM system is updated to include the selections and entries made during the single-action data entry path.

Logging Environment

FIG. 1 shows an example environment 100 of rapidly logging sales activities. FIG. 1 includes sales activity store 102, entity store 105, calendar store 112, and location store 118. FIG. 1 also includes user computing device 106, application 108, and network(s) 115. FIG. 1 further shows calendar engine 122, identification engine 125, and location engine 128. In other implementations, environment 100 may not have the same elements as those listed above and/or may have other/different elements instead of, or in addition to, those listed above such as a MRU store, CRM store, or CRM engine. The different elements can be combined into single software modules and multiple software modules can run on the same hardware.

In some implementations, network(s) 115 can be any one or any combination of Local Area Network (LAN), Wide Area Network (WAN), WiFi, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, the engines can be of varying types including workstations, servers, computing clusters, blade servers, server farms, or any other data processing systems or computing devices. The engines can be communicably coupled to the datastores via a different network connection. For example, calendar engine 122 can be coupled via the network 125 (e.g., the Internet), identification engine 125 can be coupled via a direct network link, and location engine 128 can be coupled by yet a different network connection.

In some implementations, datastores can store information from one or more tenants into tables of a common database image to form a multi-tenant database system (MTS). A database image can include one or more database objects. In other implementations, the datastores can be relation database management systems (RDBMSs), object oriented database management systems (OODBMSs), distributed file systems (DFS), or any other data storing systems or computing devices. In some implementations, user computing device 106 can be a personal computer, laptop computer, tablet computer, smartphone, personal digital assistant (PDA), digital image capture devices, and the like.

Entity data store 105 specifies various entities (persons and organizations) such as contacts, accounts, opportunities, and/or leads and further provides business information related to the respective entities. Examples of business information can include names, addresses, job titles, number of employees, industry types, territories, market segments, contact information, employer information, stock rate, etc. In one implementation, entity data store 105 can store web or database profiles of the users and organizations as a system of interlinked hypertext documents that can be accessed via the network 115 (e.g., the Internet). In another implementation, entity data store 105 can also include standard profile information about persons and organizations. This standard profile information can be extracted from company websites, business registration sources such as Jigsaw, Hoovers, or D&B, business intelligence sources, and/or social networking websites Like Yelp, Yellow Pages, etc.

A "Lead" refers to an entity (person or organization) that has expressed interest in a product or service of a seller or service provider. Conversely, a Lead can be an entity that may not have expressed interest but appears to have a profile similar to that of seller's or service provider's target customer. In one implementation, leads can be stored based on industry type, market segment, number of employees, customer segment, employee size, product line, service type, stock rate, Location, or territory. In another implementation, entity data store 105 can include business-to-business data of individuals belonging to a lead, referred to as "contacts," along with some supplemental information. This supplemental information can be names, addresses, job titles, usernames, contact information, employer name, etc.

An "opportunity" is an entity (person or organization) that has taken an affirmative action to show the intent and ability to purchase a given type of product or service. A qualification process can be used to identify opportunities. The qualification process can include determining whether a lead has a need for a product or service, that lead sees value in an offering, that the lead has the financial resources for a deal, that there is access to a decision-maker, etc. Opportunities can be classified based on industry type, number of employees, market segment, customer segment, employee size, product line, service type, stock rate, location, or territory. In one implementation, entity data store 105 can include business-to-business data of individuals belonging to an opportunity, referred to as "contacts," along with some supplemental information. This supplemental information can be names, addresses, job titles, usernames, contact information, employer name, etc.

An "account" is an entity (person or organization) that has contractually committed to purchase a given type of product or service. Accounts can be classified based on revenue generated, delivery, payment, industry type, number of employees, market segment, customer segment, employee size, product line, service type, stock rate, location, or territory. In one implementation, entity data store 105 can include business-to-business data of individuals belonging to an opportunity, referred to as "contacts," along with some supplemental information. This supplemental information can be names, addresses, job titles, usernames, contact information, employer name, etc.

A "contact" refers to a person in an organization with whom a sales representative can communicate in pursuit of a lead or opportunity. It can also refer to a person working for or representing an existing account. In one implementation, contacts can be stratified based at least on geographic territories, job functions, skills, expertise, age, gender, or location proximities.

Sales activity store 102 can store data created, manipulated, or updated by performance of sales activities against the entities. Examples of sales activities can include check-ins, follow-ups, note-taking, emailing, calling, or geo-fencing. In one implementation, it can include implicit information associated with the sales activities and their performances, such including location of the user computing device 106, user token and time of logging. In some implementations, sales activity store 102 can include different stores, tables, objects, or fields to uniquely identify the sales activities performed on respective entities.

Regarding calendar engine 122, it can access calendar-based services such Outlook Calendar, Google Calendar, iCal, and the like to identify calendar events of a sales representative. In one implementation, calendar events can be stored in calendar store 112 that specifies at least calendar entries, event subscriptions, sign-ins, or check-ins related to a sales event. In another implementation, calendar engine 122 can access specific details related to the sales event such as names of the event attendees, also stored in the calendar store 112. In yet another implementation it can automatically obtain check-in information for the sales representative via a smartphone or other user computing device 106 that includes GPS and appropriate communications capability.

In one implementation, location engine 128 can obtain location information of the sales representative when he arrives at a site that is equipped with WiFi, near field communication (NFC) tags or stickers, or quick response (QR) codes adapted to interact with user computing device 106. In this implementation, a smartphone, equipped with the requisite communications and/or imaging capabilities, can communicate with the on-site equipment and communicate results to a remote server such as the location engine 128. In another implementation, location engine 128 can access specific details related to the sales event like location of the sales event (addresses, longitudes, latitudes, elevations), stored in location store 118.

Sales representative's arrival at the sales event can be automatically detected using GPS, GNSS, WiFi, NFC, or QR codes. In one implementation, location engine 128 can perform location comparisons using GPS information to ascertain that the sales representative is within ten feet of a gate or an entity. Other threshold distances such as or in a range of 5, 10, 20 or 50 feet can be used. In other implementations, WiFi fingerprints/triangulation, NFC proximity, or QR scanning codes can be used to immediately detect the arrival of the sales representative at the sales event.

Once the arrival is detected, a check-in process can be automatically initiated according to one implementation. In this implementation, a check-in request can be automatically generated and presented to the sales representative via his smartphone or other user computing device 106. In another implementation, the check-in request can be fully automatic, providing only a short message on the user computing device 106. In another implementation, the sales representative can be presented with a prompt, to which a response can be requested. In yet another implementation, the check-in can proceed silently without notifying sales representative and further trigger a series of commands to be executed such as changing phone settings, creating and sending a text, or launching an application. In any of the above or other implementations, the check-in request can be delayed for a period of time or an indicator can be set to show that a check-in request is pending and that a response is awaited.

In one implementation, the check-in can be initiated in response to the sales representative actions such as providing a voice command or selecting an indicator or screen object displayed on an interface. Furthermore, the sales representative can share his check-in information with other members of his sales team by posting a summary of the check-in on his online social networks such as Chatter, Facebook, Twitter, etc. In some implementations, the check-in summary can include a combination of textual (comments, mentions) and non-textual content (performance meters, badges, maps shots). In one implementation, the sales representative can access check-in information for other members of his sales team to avoid scheduling a sales event with the same entity twice in the same day.

Identification engine 125 can identify entities in dependence upon presence of records of the entities in a list of most recently accessed programs, files, and documents. In one implementation, identification engine 125 can query a most-recently-used (MRU) cache to identify records that were most recently accessed by the sales representative. In some implementations, it can identify most recently accessed information from one or more devices such as a laptop computer, tablet computer, smartphone, etc. In other implementations, it can receive user preferences from the sales representative to query most recently accessed information from a particular device.

Identification engine 125 can select entities in dependence upon registering triggers. Examples of triggers can include reaching time windows or receiving location coincidences. Triggers can act as scripts that execute before or after specific data manipulation language (DML) events occur, such as before object records are inserted into a database, timestamp or locationstamp values are recorded or after records have been deleted. In one implementation, data deployment drills can be created and automatically executed when a trigger is initiated.

Identification engine 125 can identify a position of a sales activity in a sales workflow. For instance, a sales workflow can be created to include various stages such as referrals, relationship establishment, need analysis, pitch, marketing, negotiation, closing, service or product fulfillment, follow up, etc. Furthermore, performance of a sequence of sales activities of defined duration can allocated to respective stages of the sales workflow. In one example, a sales workflow can specify that relationship establishment stage includes a successor sales activity like follow-up to be performed two days after performance of a predecessor sales activity such as check-in.

Logging

In some implementations, the sales representative can identify an entity and a sales activity that he would like to perform against the entity by a user selection or commit behavior across am interface. In one implementation, the interface can be provided by a sales logging application 108 such Salesforce's Sales Logger product, running on a user computing device 106 such as a personal computer, laptop computer, tablet computer, smartphone, personal digital assistant (PDA), or digital image capture device. The sales logging application 108 can include various interfaces 200-900 that identify different sales activities being performed against the entities. In other implementations, application 108 may not have the same interfaces or screen objects as those listed above and/or may have other/different interfaces or screen objects instead of, or in addition to, those listed above such as a device pane, preferences pane, prioritized pane, filter tab, or approval tab. The different elements can be combined into single software modules and multiple software modules can run on the same hardware.

The sales logging application 108 can take one of a number of forms, including user interfaces, dashboard interfaces, engagement consoles, and other interfaces, such as mobile interfaces, tablet interfaces, summary interfaces, or wearable interfaces. In some implementations, they can be hosted on a web-based or cloud-based privacy management application running on a computing device such as a personal computer, laptop computer, mobile device, and/or any other hand-held computing device. They can also be hosted on a non-social local application running in an on-premise environment. In one implementation, interfaces 200-900 can be accessed from a browser running on a computing device. The browser can be Chrome, Internet Explorer, Firefox, Safari, and the like. In other implementations, interfaces 200-900 can nm as engagement consoles on a computer desktop application.

FIG. 2 illustrates one implementation of an interface 200 displaying records of entities that have been most recently accessed. Interface 200 includes a most recently accessed screen object 202, search screen object 204, and settings screen object 208. It also categorizes the entities using different screen objects including contacts screen object 212, accounts screen object 214, opportunities screen object 216, and leads screen object 218. In one implementation, the sales representative can select the most recently accessed screen object 202 and further select the contacts screen object 212 to view the contacts that he has recently accessed or whose records he has recently accessed. In this implementation, interface 200 displays three contacts that have been identified as most recently accessed by the sales representative, namely "Shannon Hale," "Edward O'Leary," and "John Smith."

In other implementations, most recently accessed accounts, opportunities, and leads or records of the same can be displayed upon respective selection of accounts screen object 214, opportunities screen object 216, and leads screen object 218. In some implementations, the sales representative can filter the results based on one or more devices from which he has accessed the entities or records of the entities. Additionally, selection of the settings screen object 208 can lead to a display that provides multiple options for creating user-definitions. In one instance, such a display can enable the sales representative to specify time periods within which he previously accessed the entities or records of the entities and further customize identification of the most recently accessed entities in dependence upon the specified time periods. In one implementation, settings screen object 208 can allow the sales representative to filter the display of entities and other screen objects. In another implementation, it can receive addresses of supplementary electronic sources such emails, drives, data repositories, etc. to which selections and entries made by the sales representative in the sales logging application 108 can be logged.

FIG. 3 is one implementation of an interface 300 displaying various sales activities that can be performed against entities. In particular, interface 300 displays a list of sales activities that can be performed against a contact 302 selected by the sales representative, namely "Edward O'Leary." Interface 300 includes a check-in screen object 312, follow-up screen object 314, take note screen object 316, call screen object 322, email screen object 324, and map screen object 326.

In one implementation, selection of the check-in screen object 312 can result in registering of electronic check-ins of events linked to contact 302. In another implementation, selection of the follow-up screen object 314 can lead to logging of follow-up tasks linked to contact 302. In another implementation, selection of the take note screen object 316 can create notes and memorandums linked to contact 302. In another implementation, selection of the call screen object 322 can result in logging of voice calls made to contact 302. In another implementation, selection of the email screen object 324 can cause logging of emails sent to contact 302. In yet another implementation, selection of the map screen object 326 can lead to a map display that includes location-aware information of contact 302. In some implementations, the map display can show the presence of contact 302 in sales representative's geographic or physical proximity by an active icon.

FIG. 4 shows one implementation of an interface 400 displaying logging of check-in events linked to entities. Interface 400 includes a text pane 402, cancel screen object 412, check-in screen object 418, and share screen object 428. In one implementation, the sales representative can enter some text in the text pane 402 describing a sales event linked to contact 302. In another implementation, text pane 402 can be automatically filled without manual entries using templates that include default and dynamic ghost text modifiable by the sales representative. The default ghost text can supply pre-assigned values applicable to all entities and sales activities of a given type such as standard statements like "Just had a meeting with" or "Attended." The dynamic ghost text can supply context-aware values specific to a selected entity and sales activity such as name of the entity, type of the sales activity, time of performance of the sales activity, and/or information about location of performance of the sales activity.

In one implementation, by selecting the check-in screen object 418, a CRM system can be updated to include the selections and entries made by the sales representative across interface 400. In another implementation, the selections and entries made by the sales representative across interface 400 can be discarded by selecting the cancel screen object 412. In yet another implementation, representations created based on selections and entries made by the sales representative across interface 400 can be shared on one or more online social networks of the sales representative (Chatter, Facebook, and Twitter) by selecting the share screen object 428.

FIG. 5 is one implementation of an interface 500 displaying logging of follow-up tasks linked to entities. Interface 500 includes a follow-up screen object 502, reminder date screen object 512, text pane 522, cancel screen object 532, save task screen object 538, and share screen object 428. In one implementation, follow-up screen object 502 identifies the sales activity that the sales representative has selected to perform. In other implementations, the sales activity can be automatically selected independence upon position of the sale activity in a sales workflow and time elapsed since launch of the sales workflow.

Reminder date screen object 512 enables the sales representative to specify a date on which he wants to be reminded of doing a follow-up task related to the selected contact 302. In one implementation, the sales representative can enter some text in the text pane 522 describing a follow-up task that he wants to perform with respect to the selected contact 302. In another implementation, text pane 522 can be automatically filled without manual entries using templates that include default and dynamic ghost text modifiable by the sales representative. The default ghost text can supply pre-assigned values applicable to all entities and sales activities of a given type such as standard statements like "Do the following:" or "The next task is." The dynamic ghost text can supply context-aware values specific to a selected entity and sales activity such as name of the entity, type of the sales activity, and/or time of performance of the sales activity.

In one implementation, by selecting the save task screen object 538, a CRM system can be updated to include the selections and entries made by the sales representative across interface 500. In another implementation, the selections and entries made by the sales representative across interface 500 can be discarded by selecting the cancel screen object 532. In yet another implementation, representations created based on selections and entries made by the sales representative across interface 500 can be shared on one or more online social networks of the sales representative (Chatter, Facebook, and Twitter) by selecting the share screen object 428.

FIG. 6 illustrates one implementation of an interface 600 displaying logging of email communications with entities. Interface 600 includes a text pane 602, cancel screen object 612, log email screen object 618, and share screen object 428. In one implementation, the sales representative can use text pane 602 to create the body of an email that he wants to send to the selected contact 302. In another implementation, text pane 602 can be automatically filled without manual entries using templates that include default and dynamic ghost text modifiable by the sales representative. The default ghost text can supply pre-assigned values applicable to all entities and sales activities of a given type such as signatures and standard statements like "Hope you are doing great" or "We would like to offer." The dynamic ghost text can supply context-aware values specific to a selected entity and sales activity such as name of the entity, email address of the entity, type of the sales activity, and/or time of performance of the sales activity.

In one implementation, by selecting the log email screen object 618, a CRM system can be updated to include the selections and entries made by the sales representative across interface 600. In another implementation, the selections and entries made by the sales representative across interface 600 can be discarded by selecting the cancel screen object 612. In yet another implementation, representations created based on selections and entries made by the sales representative across interface 600 can be shared on one or more online social networks of the sales representative (Chatter, Facebook, and Twitter) by selecting the share screen object 428. In some implementations, the settings screen object 208 can lead to a display that provides the sales representative with an option of entering a "logger" email address. The logger email address can be added as a private or blind (BCC) receipt of all emails sent out via the sales logging application 108 according to some other implementations.

FIG. 7 shows one implementation of an interface 700 displaying logging of voice communications with entities. Interface 700 includes a text pane 702, cancel screen object 712, log call screen object 718, and share screen object 428. In one implementation, the sales representative can summarize a voice call made to the selected contact 302 in text pane 702. In another implementation, text pane 702 can be automatically filled without manual entries using templates that include default and dynamic ghost text modifiable by the sales representative. The default ghost text can supply pre-assigned values applicable to all entities and sales activities of a given type such as standard statements like "We discussed" or "Based on the telephonic conversation." The dynamic ghost text can supply context-aware values specific to a selected entity and sales activity such as name of the entity, contact number of the entity, type of the sales activity, time of performance of the sales activity, and/or length of the sales activity.

In one implementation, by selecting the log call screen object 718, a CRM system can be updated to include the selections and entries made by the sales representative across interface 700. In another implementation, the selections and entries made by the sales representative across interface 700 can be discarded by selecting the cancel screen object 712. In yet another implementation, representations created based on selections and entries made by the sales representative across interface 700 can be shared on one or more online social networks of the sales representative (Chatter, Facebook, and Twitter) by selecting the share screen object 428.

FIG. 8 is one implementation of an interface 800 displaying logging of memorandums linked to entities. Interface 800 includes a text pane 802, cancel screen object 812, save note screen object 818, share screen object 428, and private note screen object 838. In one implementation, the sales representative can create notes and memorandum s related to the selected contact 302 in text pane 802. Furthermore, by selecting the save note screen object 818, a CRM system can be updated to include the selections and entries made by the sales representative across interface 800. In another implementation, the selections and entries made by the sales representative across interface 800 can be discarded by selecting the cancel screen object 812. In yet another implementation, representations created based on selections and entries made by the sales representative across interface 800 can be shared on one or more online social networks of the sales representative (Chatter, Facebook, and Twitter) by selecting the share screen object 428. In some implementations, the private note screen object 838 can enable the sales representative to restrict access to a note by characterizing it as private.

FIG. 9 shows one implementation of an interface 900 displaying entity search among most recently accessed records of entities. Interface 900 includes a search tab 902 and result pane 912. In one implementation, the sales representative can search entities of his interest by specifying the beginning alphabets of the names of the entities in search tab 902. As shown in FIG. 9, as the sales representative starts typing the text "ha," the result pane 912 suggests a contact (Shannon Hale) that matches the typed text. In some implementations, the search can be customized to only query a specify type of entity. Also, the search results can be prioritized based on event imminence or geographic proximities according to some other implementations.

Logged Records

FIG. 10 illustrates one implementation of a plurality of objects 1000 that can be used to rapidly log sales activities performed against entities. This and other data structure descriptions that are expressed in terms of objects can also be implemented as tables that store multiple records or object types. Reference to objects is for convenience of explanation and not as a limitation on the data structure implementation. FIG. 10 shows a contact object 1015 to a check-in object 1002, follow-up object 1004, email object 1012, geo fence object 1018, call object 1022, and note object 1024. In other implementations, objects 1000 may not have the same objects, tables, fields or entries as those listed above and/or may have other/different objects, tables, fields or entries instead of, or in addition to, those listed above such as a work object, education object, or contact information object such as account object, opportunities object, or lead object.

Contact object 1015 uses a user ID referred to as "UserID*" to uniquely identify a contact selected by the sales representative. It also specifies the first name (FirstName) and last name (LastName) of the selected contact. In other implementations, contact object 1015 can hold other supplemental information related to the selected contact such as employer name, job title, address, etc.

Check-in object 1002 uniquely identifies a check-in activity performed against the contact specified in the contact object 1015 using an activity ID referred to as "ActID*." It also specifies the time (Time), date (Date), and location (Location) of the check-in event. It further holds any text (Text) provided by the sales representative while performing the check-in event.

Follow-up object 1004 uniquely identifies a follow-up task performed against the contact specified in the contact object 1015 using an activity ID referred to as "ActID*." It also specifies the time (Time) and date (Date) when the follow-up task was created. It further identifies the date (RemDate) on which a reminder for the follow-up task was requested. It also holds any text (Text) provided by the sales representative while creating the follow-up task.

Email object 1012 uniquely identifies an email sent to the contact specified in the contact object 1015 using an activity ID referred to as "ActID*." It also specifies the time (Time) and date (Date) when the email was sent, along with the email address of the recipient (RecpAdd) and text (Text) of the email body. In other implementations, it can identify any private or blind (BCC) recipients of the email, along with any supplementary electronic sources in which the email was logged.

Geo fence object 1018 includes an activity ID referred to as "ActID*" that uniquely identifies a discovery of the contact specified in the contact object 1015 in the geographic proximity of the sales representative. It also specifies the time (Time), date (Date), and location (Location) of the discovery. It further holds any text (Text) provided by the sales representative when the contact was discovered.

Call object 1022 identifies a voice call made to the contact specified in the contact object 1015 using an activity ID referred to as "ActID*." It also specifies the time (Time), date (Date), and length (Length) of the call. It further holds any text (Text) provided by the sales representative while logging the call.

Note object 1024 uniquely identifies a note-taking activity performed against the contact specified in the contact object 1015 using an activity ID referred to as "ActID*." It also identifies the time (Time), date (Date), and access rights (Access) specified for a note. It further holds the text (Text) included in the note.

Flowchart of Triple-Action Logging

FIG. 11 is a flowchart 1100 of one implementation of logging of sales activities by a triple-action data entry path. Flowchart 1100 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 11. Multiple actions can be combined in some implementations. For convenience, this flowchart is described with reference to the system that carries out a method. The system is not necessarily part of the method.

Flowchart 1100 describes a streamlined triple-action data entry path using a server in communication with a mobile device that registers three user commit behaviors. The first user commit behavior is registered at action 1120 and results in a selection of a particular entity from a group of identified entities. The second user commit behavior is registered at action 1140 and causes a selection of a particular sales activity from a list of identified entities. The third user commit behavior is registered at action 1160, in response to which, a CRM system is updated to include selections and entries made during the streamlined triple-action data entry path.

At action 1110, entities are automatically identified as most likely to be selected for sales activity logging. This identification of entities is dependent at least upon access recency of records of the entities, imminence of events linked to the entities, and geographic proximities of the entities to the user. Imminence of events linked to the entities is sensed by identifying windows of time scheduled for the events. The windows of time are identified by periodically checking electronic calendars and determining whether the events are within thresholds of time that specify imminence of the events. Geographic proximities of the entities to the user are calculated by finding coincidences of location between the entities and the user. The coincidences of location are found by periodically checking user's geographic location and determining whether the user is proximate to geographic locations of the entities based on thresholds of proximities. The access recency of records of the entities is determined in dependence upon presence of records of the entities in a list of most recently accessed programs, files, and documents.

At action 1120, data that identifies the most likely entities and an interface that accepts selection among the most likely entities by a first action are transmitted. The first action refers to a user commit behavior that can be executed by a voice, visual, physical, or text command. Examples of the first action can include speaking in a microphone, blinking of eye across an eye tracking device, moving a body part across a motion sensor, pressing a button on a device, selecting a screen object on an interface, or entering data across an interface.

At action 1130, a list of sales activities that fits on signal screen is identified. The sales activities identified in the list include registering electronic check-ins of events linked to the entities, logging summaries of events linked to the entities, logging follow-up tasks linked to the entities, creating memorandums linked to the entities, and logging communications with the entities.

At action 1140, the list is transmitted for display on an interface that accepts selection among the sales activities by a second action. The second action refers to a user commit behavior that can be executed by a voice, visual, physical, or text command. Examples of the second action can include speaking in a microphone, blinking of eye across an eye tracking device, moving a body part across a motion sensor, pressing a button on a device, selecting a screen object on an interface, or entering data across an interface.

At action 1150, a comment entry screen is transmitted for display. The comment entry screen includes at least some ghost text that a user has an option to revise. In one implementation, the data for sales activities is logged without manual entries using templates that include default and dynamic ghost text modifiable by the user. The default ghost text supplies pre-assigned values applicable to all entities and sales activities of a given type. The dynamic ghost text supplies context-aware values specific to a selected entity and sales activity.

At action 1160, the ghost or revised ghost text is received in response to a third action. The third action refers to a user commit behavior that can be executed by a voice, visual, physical, or text command. Examples of the third action include speaking in a microphone, blinking of eye across an eye tracking device, moving a body part across a motion sensor, pressing a button on a device, selecting a screen object on an interface, or entering data across an interface.

At action 1170, a customer relation management system is updated with data dependent upon at least one of the selected particular entity, selected sales activity, and received ghost or revised ghost text along with some implicit context-aware information such as location of the mobile device, user token and time of logging.

Flowchart of Double-Action Logging

FIG. 12 shows a flowchart 1200 of one implementation of logging of sales activities by a double-action data entry path. Flowchart 1200 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 12. Multiple actions can be combined in some implementations. For convenience, this flowchart is described with reference to the system that carries out a method. The system is not necessarily part of the method.

Flowchart 1200 describes a streamlined double-action data entry path that registers two user commit behaviors, as opposed to three user commit behaviors described in flowchart 1100. The first user commit behavior is registered at action 1220 and results in a selection of a particular entity from a group of identified entities. The second user commit behavior is registered at action 1260, in response to which, a CRM system is updated to include selections and entries made during the streamlined triple-action data entry path. Also, actions 1230 and 1240 of flowchart 1200 most significantly differ from respective actions 1130 and 1140 of flowchart 1100 because in flowchart 1200, an automatic selection of a particular sales activity takes place instead of an identification of a list of sales activities, described in flowchart 1100.

At action 1210, implicit context-aware information from a mobile device is received. In one implementation, the implicit context-aware information can at least include a location of the mobile device (longitude, latitude, and elevation) and a user token that identifies the user of the application 108, and time of logging.

At action 1220, entities are automatically identified as most likely to be selected for sales activity logging. This identification of entities is dependent at least upon access recency of records of the entities, imminence of events linked to the entities, and geographic proximities of the entities to the user. Imminence of events linked to the entities is sensed by identifying windows of time scheduled for the events. The windows of time are identified by periodically checking electronic calendars and determining whether the events are within thresholds of time that specify imminence of the events. Geographic proximities of the entities to the user are calculated by finding coincidences of location between the entities and the user. The coincidences of location are found by periodically checking user's geographic location and determining whether the user is proximate to geographic locations of the entities based on thresholds of proximities. The access recency of records of the entities is determined in dependence upon presence of records of the entities in a list of most recently accessed programs, files, and documents.

At action 1230, data that identifies the most likely entities and an interface that accepts selection among the most likely entities by a first action are transmitted. The first action refers to a user commit behavior that can be executed by a voice, visual, physical, or text command. Examples of the first action can include speaking in a microphone, blinking of eye across an eye tracking device, moving a body part across a motion sensor, pressing a button on a device, selecting a screen object on an interface, or entering data across an interface.

At action 1240, a sales activity, that is identified as most likely to be executed, is automatically performed against the identified entity. The identification of the sales activity is dependent at least upon position of the sale activity in a sales workflow and time elapsed since launch of the sales workflow.

At action 1250, data that identifies the performed sales activity is transmitted for display on an interface. Examples of the sales activity include registering electronic check-ins of events linked to the entities, logging summaries of events linked to the entities, logging follow-up tasks linked to the entities, creating memorandums linked to the entities, and logging communications with the entities.

At action 1260, a comment entry screen is transmitted for display. The comment entry screen includes at least some ghost text that a user has an option to revise. In one implementation, the data for sales activities is logged without manual entries using templates that include default and dynamic ghost text modifiable by the user. The default ghost text supplies pre-assigned values applicable to all entities and sales activities of a given type. The dynamic ghost text supplies context-aware values specific to a selected entity and sales activity.

At action 1270, the ghost or revised ghost text is received in response to a second action. The second action refers to a user commit behavior that can be executed by a voice, visual, physical, or text command. Examples of the second action include speaking in a microphone, blinking of eye across an eye tracking device, moving a body part across a motion sensor, pressing a button on a device, selecting a screen object on an interface, or entering data across am interface.

At action 1280, a customer relation management system is updated with data dependent upon at least one of the selected particular entity, selected sales activity, and received ghost or revised ghost text along with the implicit context-aware information.

Flowchart of Single-Action Logging

FIG. 13 illustrates a flowchart 1300 of one implementation of logging of sales activities by a single-action data entry path. Flowchart 1300 can be implemented at least partially with a database system, e.g., by one or more processors configured to receive or retrieve information, process the information, store results, and transmit the results. Other implementations may perform the actions in different orders and/or with different, fewer or additional actions than the ones illustrated in FIG. 13. Multiple actions can be combined in some implementations. For convenience, this flowchart is described with reference to the system that carries out a method. The system is not necessarily part of the method.

Flowchart 1300 describes a streamlined single-action data entry path that registers only one user commit behavior, as opposed to three and two user commit behaviors respectively described in flowchart 1100 and flowchart 1200. As shown in flowchart 1300, the first and only user commit behavior is registered at action 1360, in response to which, a CRM system is updated to include selections and entries made during the streamlined triple-action data entry path. Also, actions 1310 and 1320 of flowchart 1300 most significantly differ from respective actions 1110 and 1120 of flowchart 1100 and respective actions 1210 and 1220 of flowchart 1200. In flowchart 1300, a particular entity is automatically identified, while flowchart 1100 and 1200 include manually selecting an entity from a group of identified entities.

At action 1310, implicit context-aware information from a mobile device is received. In one implementation, the implicit context-aware information can at least include a location of the mobile device (longitude, latitude, and elevation) and a user token that identifies the user of the application 108, and time of logging.

At action 1320, an entity that is identified as most likely to be contacted, used, or acted upon is automatically selected. The identification of the entity is dependent at least upon access recency of records of the entity, imminence of events linked to the entity, and geographic proximities of the entity to the user. Imminence of events linked to the entity is sensed by identifying windows of time scheduled for the events. The windows of time are identified by periodically checking electronic calendars and determining whether the events are within thresholds of time that specify imminence of the events. Geographic proximities of the entity to the user are calculated by finding coincidences of location between the entity and the user. The coincidences of location are found by periodically checking user's geographic location and determining whether the user is proximate to geographic locations of the entity based on thresholds of proximities. The access recency of records of the entity is determined in dependence upon presence of records of the entity in a list of most recently accessed programs, files, and documents.

At action 1330, data that identifies the selected entity is transmitted across an interface. Depending upon whether the entity is a person or organization, the data can include varying supplemental information about the entity such as name, address, job title, username, contact information, employer name, number of employees, industry type, geographic territory, skills, expertise, products, services, stock rate, etc.

At action 1340, a sales activity, that is identified as most likely to be executed, is automatically performed against the identified entity. The identification of the sales activity is dependent at least upon position of the sale activity in a sales workflow and time elapsed since launch of the sales workflow.

At action 1350, data that identifies the performed sales activity is transmitted for display on an interface. Examples of the sales activity include registering electronic check-ins of events linked to the entities, logging summaries of events linked to the entities, logging follow-up tasks linked to the entities, creating memorandums Linked to the entities, and logging communications with the entities.

At action 1360, a comment entry screen is transmitted for display. The comment entry screen includes at least some ghost text that a user has an option to revise. In one implementation, the data for sales activities is logged without manual entries using templates that include default and dynamic ghost text modifiable by the user. The default ghost text supplies pre-assigned values applicable to all entities and sales activities of a given type. The dynamic ghost text supplies context-aware values specific to a selected entity and sales activity.

At action 1370, the ghost or revised ghost text is received in response to a second action. The second action refers to a user commit behavior that can be executed by a voice, visual, physical, or text command. Examples of the second action include speaking in a microphone, blinking of eye across an eye tracking device, moving a body pall across a motion sensor, pressing a button on a device, selecting a screen object on an interface, or entering data across an interface.

At action 1380, a customer relation management system is updated with data dependent upon at least one of the selected particular entity, selected sales activity, and received ghost or revised ghost text along with the implicit context-aware information.

Computer System

FIG. 14 is a block diagram of an example computer system 1400 for rapidly logging sales activities. FIG. 14 is a block diagram of an example computer system, according to one implementation. Computer system 1410 typically includes at least one processor 1414 that communicates with a number of peripheral devices via bus subsystem 1412. These peripheral devices can include a storage subsystem 1424 including, for example, memory devices and a file storage subsystem, user interface input devices 1422, user interface output devices 1420, and a network interface subsystem 1418. The input and output devices allow user interaction with computer system 1410. Network interface subsystem 1416 provides an interface to outside networks, including an interface to corresponding interface devices in other computer systems.

User interface input devices 1422 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1410.

User interface output devices 1420 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 810 to the user or to another machine or computer system.

Storage subsystem 1424 stores programming and data constructs that provide the functionality of some or all of the modules and methods described herein. These software modules are generally executed by processor 1414 alone or in combination with other processors.

Memory 1428 used in the storage subsystem can include a number of memories including a main random access memory (RAM) 1430 for storage of instructions and data during program execution and a read only memory (ROM) 1432 in which fixed instructions are stored. A file storage subsystem 1428 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1428 in the storage subsystem 1424, or in other machines accessible by the processor.

Bus subsystem 1412 provides a mechanism for letting the various components and subsystems of computer system 1410 communicate with each other as intended. Although bus subsystem 1412 is shown schematically as a single bus, alternative implementations of the bus subsystem can use multiple busses.

Computer system 1410 can be of varying types including a workstation, server, computing cluster, blade server, server farm, or any other data processing system or computing device. Due to the ever-changing nature of computers and networks, the description of computer system 1410 depicted in FIG. 14 is intended only as one example. Many other configurations of computer system 1410 are possible having more or fewer components than the computer system depicted in FIG. 14.

Particular Implementations

In one implementation, a method is described from the perspective of a server receiving messages from user software. The method includes providing a streamlined, triple-action data entry path using a server in communication with a mobile device that automatically identifies entities as most likely to be selected for sales activity logging, transmits for display data that identifies the most likely entities and an interface that accepts selection among the most likely entities by a first action, receives a selection of a particular entity responsive to the first action, identifies a list of sales activities that fits on a single screen, and transmits for display the list of sales activities with an interface that accepts selection among the sales activities by a second action, receives a sales activity selection responsive to the second action, transmits for display a comment entry screen with at least some ghost text that a user has an option to revise, and receives the ghost or revised ghost text responsive to a third-action. It also includes updating a customer relation management system with data dependent upon at least one of the selected particular entity, selected sales activity, and received ghost or revised ghost text.

This and other method described can be presented from the perspective of a mobile device and user software interacting with the server. From the mobile device perspective, the method provides a streamlined, triple-action data entry path, relying on the server to automatically identify entities as most likely to be selected for sales activity logging. The method includes receiving for display data that identifies the most likely entities and an interface that accepts selection among the most likely entities by a first action, responsive to a first action, transmitting a selection of a particular entity, receiving a list of sales activities that fits on a single screen, responsive to a second action, accepting selection among the sales activities and transmitting the selection, receiving for display a comment entry interface with at least some ghost text that a user has an option to revise, and responsive to a third action, transmitting the ghost or revised ghost text responsive. In some implementations, the mobile device will receive for display data after updating of a customer relation management system that confirms capture of the selected particular entity, selected sales activity, and received ghost or revised ghost text, and implicit context-aware information including the mobile device location, dependent on a user token.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations such as logging environment, logging, logged records, triple-action logging, double-action logging, or single-action logging.

The method further includes providing the data entry path that further receives implicit context-aware information including location of the mobile device, user token and time of logging and updating the customer relation management system to further include the implicit context-aware information.

The entities represent at least contacts, accounts, opportunities, and leads. Also, the identification of entities as most likely to be selected for sales activity logging is dependent upon at least one of access recency of records of the entities, imminence of events linked to the entities, and geographic proximities of the entities to the user.

The method further includes sensing imminence of events linked to the entities by identifying windows of time scheduled for the events. The windows of time are identified by periodically checking electronic calendars and determining whether the events are within thresholds of time that specify imminence of the events.

The method further includes calculating geographic proximities of the entities to the user by finding coincidences of location between the entities and the user. The coincidences of location are found by periodically checking user's geographic location and determining whether the user is proximate to geographic locations of the entities based on thresholds of proximities.

The access recency of records of the entities is determined independence upon presence of records of the entities in a list of most recently accessed programs, files, and documents.

The method further including logging data for sales activities without manual entries using templates that include default and dynamic ghost text modifiable by the user. The default ghost text supplies pre-assigned values applicable to all entities and sales activities of a given type. The dynamic ghost text supplies context-aware values specific to a selected entity and sales activity.

The sales activities included in the list can include registering electronic check-ins of events linked to the entities, logging summaries of events linked to the entities, logging follow-up tasks linked to the entities, creating memorandums linked to the entities, and logging communications with the entities.

The method further include posting on user's online social networks representations of data with which the customer relation management system is updated.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described from the perspective of a server receiving messages from user software. The method includes providing a streamlined, double-action data entry path that automatically identifies entities as most likely to be selected for sales activity logging, transmits for display data that identifies the most likely entities and an interface that accepts selection among the most likely entities by a first action, receives a selection of a particular entity responsive to the first action, automatically performs a sales activity against the entity, wherein the sales activity is identified as most likely to be executed, transmits for display across an interface data that identifies the performed sales activity, transmits for display a comment entry screen with at least some ghost text that a user has an option to revise, and receives the ghost or revised ghost text responsive to a second action. It also includes updating a customer relation management system with data dependent upon at least one of the selected particular entity, the performed sales activity, and received ghost or revised ghost text along with some implicit context-aware information.

The identification of the sales activity as most likely to be executed is dependent at least upon position of the sale activity in a sales workflow and time elapsed since launch of the sales workflow.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described from the perspective of a server receiving messages from user software. The method includes providing a streamlined, single-action data entry path that automatically selects an entity that is identified as most likely to be contacted, used, or acted upon, transmits for display across an interface data that identifies the selected entity, automatically performs a sales activity against the entity, wherein the sales activity is identified as most likely to be executed, transmits for display across an interface data that identifies the performed sales activity, transmits for display a comment entry screen with at least some ghost text that a user has an option to revise, and receives the ghost or revised ghost text responsive to a first action. It also includes updating a customer relation management system with data dependent upon at least one of the selected entity, the performed sales activity, and received ghost or revised ghost text along with some implicit context-aware information.

The identification of the entity as most likely to be contacted, used, or acted upon is dependent upon at least one of access recency of records of the entity, imminence of events linked to the entity, and geographic proximities of the entity to the user. The identification of the sales activity as most likely to be executed is dependent at least upon position of the sale activity in a sales workflow and time elapsed since launch of the sales workflow.

Other implementations may include a non-transitory computer readable storage medium storing instructions executable by a processor to perform any of the methods described above. Yet another implementation may include a system including memory and one or more processors operable to execute instructions, stored in the memory, to perform any of the method s described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A method for streamlined data entry at a server, comprising:
    querying a cache for one or more most-recently-used (MRU) entities corresponding to a mobile device, wherein the cache stores a plurality of MRU entities based at least in part on a plurality of prior data logging events associated with the mobile device;
    automatically identifying one or more entities corresponding to the mobile device as most likely to be selected for data logging according to the queried one or more MRU entities;
    transmitting, for display at the mobile device, data that identifies the one or more entities and a first interface that accepts selection among the identified one or more entities;
    receiving a selection of a particular entity responsive to transmitting the data and the first interface;
    transmitting, for display at the mobile device, a second interface that includes a list of activities that fits on a single screen of the mobile device and accepts selection among the list of activities, wherein the list of activities is determined based at least in part on the selection of the particular entity;
    detecting a selection of an activity of the list of activities responsive to transmitting the second interface;
    transmitting, for display at the mobile device, a comment entry user interface comprising automatically generated ghost text, wherein the ghost text is automatically generated based at least in part on the selection of the particular entity and the selection of the activity;
    receiving, from the mobile device, an indication of a user input value from the comment entry user interface either accepting the ghost text or revising the ghost text; and
    storing, at a data store, an indication of at least the particular entity and the accepted or revised ghost text.

2. The method of claim 1, further comprising:
    receiving, from the mobile device, context-aware information comprising a location of the mobile device, a user token, a time of data logging, or a combination thereof; and
    updating the data store to include the context-aware information.

3. The method of claim 1, wherein the identification of the one or more entities as most likely to be selected for data logging is based at least in part on access recency of records of the one or more entities, imminence of events linked to the one or more entities, geographic proximity of the one or more entities to the mobile device, or a combination thereof.

4. The method of claim 1, wherein automatically identifying the one or more entities as most likely to be selected for data logging further comprises:
    identifying windows of time scheduled for events associated with the one or more entities;
    sensing imminence of the events associated with the one or more entities; and
    identifying the one or more entities as most likely to be selected for data logging based at least in part on the imminence of the events.

5. The method of claim 1, wherein automatically identifying the one or more entities as most likely to be selected for data logging further comprises:
    determining geographic proximities of the one or more entities to the mobile device; and
    identifying the one or more entities as most likely to be selected for data logging based on the geographic proximities.

6. The method of claim 1, wherein detecting the selection of the activity comprises:
    receiving, from the mobile device, an indication of the activity selection among the list of activities, wherein the automatically generated ghost text is based at least in part on the activity selection; and
    executing an activity corresponding to the activity selection against the selected entity, wherein the storing is based at least in part on the executed activity.

7. The method of claim 1, wherein detecting the selection of the activity comprises:
    automatically selecting the activity among the list of activities, wherein the selected activity is identified as most likely to be selected by a user associated with the mobile device; and
    executing an activity corresponding to the activity selection against the selected entity, wherein the storing is based at least in part on the executed activity.

8. A method for streamlined data entry at a mobile device, comprising:
    receiving, from a server, data that identifies the one or more entities and a first interface that accepts selection among the identified one or more entities, wherein the one or more entities are identified based at least in part on most-recently-used (MRU) data for the mobile device;
    transmitting, to the server, selection of a particular entity responsive to transmitting the data and the first interface;

receiving, from the server, a second interface that includes a list of activities that fits on a single screen of the mobile device and accepts selection among the list of activities, wherein the list of activities is determined based at least in part on the selection of the particular entity;

transmitting, to the server, a selection of an activity of the list of activities;

receiving, from the server, a comment entry user interface comprising automatically generated ghost text associated with the entity of the set of one or more entities and the selected activity;

receiving, from a user of the mobile device and in the user interface, a user input value either accepting the ghost text or revising the ghost text; and transmitting, to the server, an indication of the user input value, either accepting the ghost text or revising the ghost text.

9. The method of claim 8, further comprising:

transmitting, to the server, context aware information for data logging associated with the entity of the set of one or more entities.

10. The method of claim 9, wherein transmitting the context aware information for data logging comprises:

determining a geographic location of the mobile device; and transmitting, to the server, the geographic location of the mobile device, wherein the set of one or more entities is based at least in part on the geographic location of the mobile device.

11. The method of claim 8, further comprising:

receiving, from the server, an indication of confirmation, wherein the indication of confirmation comprises confirmation of a selection of the entity of the set of the one or more entities, confirmation of a selection of an activity of the list of activities associated with the entity of the set of one or more entities, conformation of reception of the user input value either accepting the ghost text or revising the ghost text, confirmation of reception of implicit context-aware information, confirmation of successful logging of data at a data store, or a combination thereof; and displaying, in the user interface, the indication of confirmation.

12. A non-transitory computer-readable medium storing code for streamlined data entry at a server, the code comprising instructions executable by a processor to:

query a cache for one or more most-recently-used (MRU) entities corresponding to a mobile device, wherein the cache stores a plurality of MRU entities based at least in part on a plurality of prior data logging events associated with the mobile device;

automatically identify one or more entities corresponding to the mobile device as most likely to be selected for data logging according to the queried one or more MRU entities;

transmit, for display at the mobile device, data that identifies the one or more entities and a first interface that accepts selection among the identified one or more entities;

receive a selection of a particular entity responsive to transmitting the data and the first interface;

transmit, for display at the mobile device, a second interface that includes a list of activities that fits on a single screen of the mobile device and accepts selection among the list of activities, wherein the list of activities is determined based at least in part on the selection of the particular entity;

detect a selection of an activity of the list of activities responsive to transmitting the second interface;

transmit, for display at the mobile device, a comment entry user interface comprising automatically generated ghost text, wherein the ghost text is automatically generated based at least in part on the selection of the particular entity and the selection of the activity;

receive, from the mobile device, an indication of a user input value from the comment entry user interface either accepting the ghost text or revising the ghost text; and store, at a data store, an indication of at least the particular entity and the accepted or revised ghost text.

13. The non-transitory computer-readable medium of claim 12, wherein the instructions are further executable to:

receive, from the mobile device, context-aware information comprising a location of the mobile device, a user token, a time of data logging, or a combination thereof; and update the data store to include the context-aware information.

14. The non-transitory computer-readable medium of claim 12, wherein the identification of the one or more entities as most likely to be selected for data logging is based at least in part on access recency of records of the one or more entities, imminence of events linked to the one or more entities, geographic proximity of the one or more entities to the mobile device, or a combination thereof.

15. The non-transitory computer-readable medium of claim 12, wherein the instructions to detect the selection of the activity are further executable to:

receive, from the mobile device, an indication of the activity selection among the list of activities, wherein the automatically generated ghost text is based at least in part on the activity selection; and execute an activity corresponding to the activity selection against the selected entity, wherein the storing is based at least in part on the executed activity.

* * * * *